US012783929B2

(12) United States Patent
García Pérez et al.

(10) Patent No.: US 12,783,929 B2
(45) Date of Patent: Nov. 3, 2026

(54) METHOD FOR ESTIMATING A VALUE OF AN OBSERVABLE QUANTITY OF A STATE OF A QUANTUM MANY-BODY SYSTEM AND APPARATUS FOR CARRYING OUT SAID METHOD

(71) Applicant: Algorithmiq Oy, Helsinki (FI)

(72) Inventors: Guillermo García Pérez, Helsinki (FI); Sabrina Maniscalco, Helsinki (FI); Matteo Rossi, Helsinki (FI); Boris Sokolov, Helsinki (FI)

(73) Assignee: ALGORITHMIQ OY, Helsinki (FI)

( * ) Notice: Subject to any disclaimer, the term of this patent is extended or adjusted under 35 U.S.C. 154(b) by 440 days.

(21) Appl. No.: 18/294,461

(22) PCT Filed: Aug. 2, 2022

(86) PCT No.: PCT/EP2022/071715
§ 371 (c)(1),
(2) Date: Feb. 1, 2024

(87) PCT Pub. No.: WO2023/012167
PCT Pub. Date: Feb. 9, 2023

(65) Prior Publication Data
US 2024/0354620 A1 Oct. 24, 2024

(30) Foreign Application Priority Data
Aug. 3, 2021 (EP) .................................... 21189425

(51) Int. Cl.
*G06N 10/40* (2022.01)

(52) U.S. Cl.
CPC .................................... *G06N 10/40* (2022.01)

(58) Field of Classification Search
CPC ...................................................... G06N 10/40
See application file for complete search history.

(56) References Cited

U.S. PATENT DOCUMENTS 12,475,401 B2 * 11/2025 Amaro .................. G06N 10/80
2020/0118025 A1 4/2020 Romero et al.
2020/0372094 A1 11/2020 Shehab et al.
2025/0094848 A1 * 3/2025 Greene Diniz ........ G06N 10/20
2025/0209357 A1 * 6/2025 García Pérez ......... G06N 10/60
2026/0099567 A1 * 4/2026 Montanaro ............. G06F 17/14

FOREIGN PATENT DOCUMENTS

EP 3 822 870 A1 5/2021
WO 2021/099428 A1 5/2021

OTHER PUBLICATIONS

Learning to measure: adaptive informationally complete generalized measurements for quantum algorithms (Year: 2021).*
International Search Report and Written Opinion in PCT/EP2022/071715 dated Oct. 24, 2022, 16 pages.

(Continued)

*Primary Examiner* — Christopher E Dunay
(74) *Attorney, Agent, or Firm* — Rothwell, Figg, Ernst & Manbeck, P.C.

(57) ABSTRACT

The present invention relates to a method for estimating a value of an observable quantity of a state of a quantum many-body system, and to an apparatus for carrying out said method.

32 Claims, 5 Drawing Sheets

(56) References Cited

OTHER PUBLICATIONS

Figure 1:
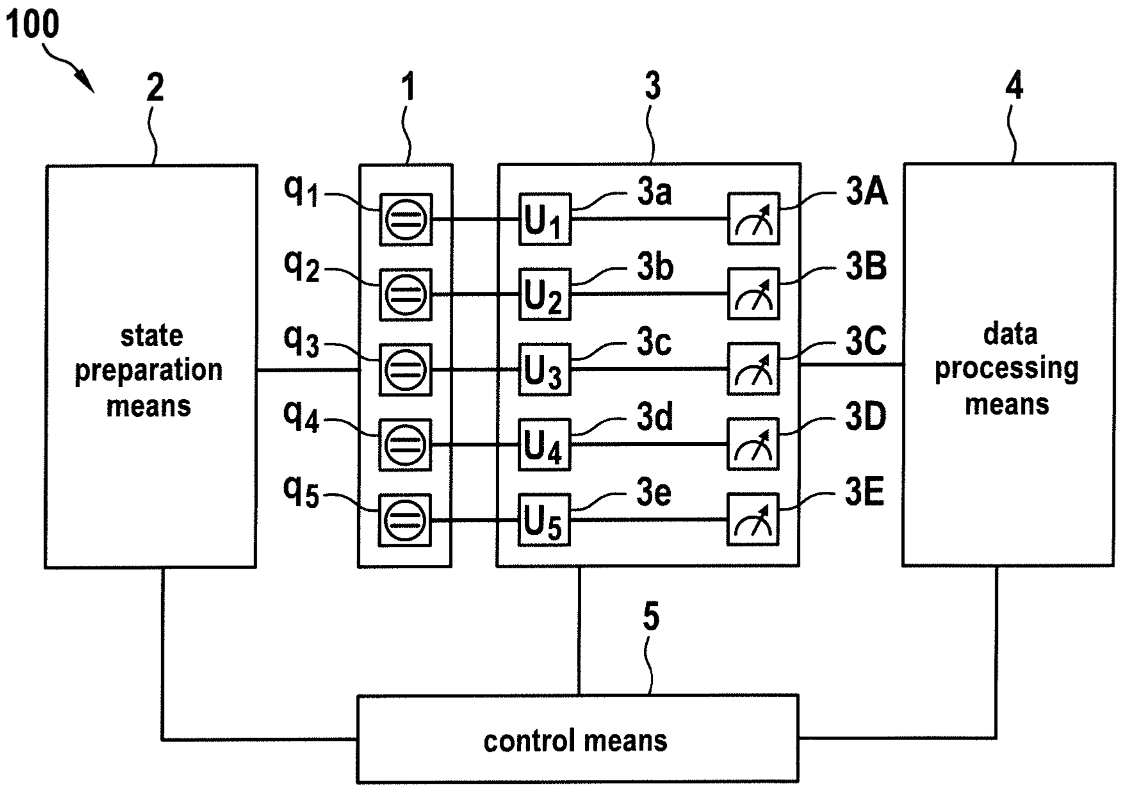

Ziman, M., "Process positive operator value measure: A mathematical framework for the description of process tomography experiments," arXiv:0802.3862v2 [quant-ph] Jul. 9, 2008, 5 pages.
Garcia-Perez, G., et al., "Learning to measure: Adaptive informationally complete POVMs for near-term quantum algorithms," arXiv:2104.00569v1 [quant-ph] Apr. 1, 2021, 16 pages.
Moll, N., et al., "Quantum optimization using variational algorithms on near-term quantum devices," arXiv:1710.01022v2 [quant-ph] Oct. 9, 2017, 30 pages.
Gonthier, J. F., et al., "Identifying challenges towards practical quantum advantage through resource estimation: the measurement roadblock in the variational quantum eigensolver," arXiv:2012.04001v1 [quant-ph], Dec. 7, 2020, 27 pages.
Oszmaniec, M., et al., "Simulating positive operator-valued measures with projective measurements," Physical Review Letters, 119, 190501 (2017), 18 pages.
Jiang, Z., et al., "Optimal fermion-to-qubit mapping via ternary trees with applications to reduced quantum state learning", Quantum 4, 276 (2020), 10 pages.
Seeley, J., et al., "The Bravyi-Kitaev transformation for quantum computation of electronic structure," J. Chem. Phys. 137, 224109 (2012), 39 pages.
Bravyi, S., et al., "Fermionic quantum computation," Annals of Physics, vol. 298, Iss. 1 (2002), pp. 210-226, 17 pages.
International Preliminary Report on Patentability for PCT/EP2022/071715 mailed Feb. 6, 2024, 12 pages.

* cited by examiner

METHOD FOR ESTIMATING A VALUE OF AN OBSERVABLE QUANTITY OF A STATE OF A QUANTUM MANY-BODY SYSTEM AND APPARATUS FOR CARRYING OUT SAID METHOD

CROSS REFERENCE TO RELATED APPLICATION(S)

This application is a 35 U.S.C. § 371 National Stage of International Patent Application No. PCT/EP2022/071715, filed Aug. 2, 2022, claiming benefit from provisional European Patent Application No. 21189425.8, filed Aug. 3, 2021, designating the United States, the disclosures of which are incorporated herein by reference in their entirety.

The present invention is related to a method for estimating a value of an observable quantity of a state of a quantum many-body system, and to an apparatus for carrying out said method.

The ability to measure a value of an observable quantity of a state of a quantum many-body system is of fundamental importance in many areas, including the field of quantum computation and quantum information theory. Quantum many-body systems comprising a register of N two-level systems, so-called qubits, are of particular importance in these areas, as they may serve as a platform for quantum computation and quantum simulation. Generally, such applications may comprise the preparation of the qubit register in a desired initial state followed by a controlled evolution of said system and a measurement of an observable quantity associated with a Hermitian operator O. In this way, it may be possible to solve computational problems that are intractable using classical computers.

One important application of quantum computation is computational chemistry. There, Noisy Intermediate-Scale Quantum (NISQ) computers are expected to enable solving some real-world problems far more efficiently than classical ones. One of the most promising approaches in that direction is to use the Variational Quantum Eigensolver (VQE) algorithm to enhance quantum chemistry simulations of strongly correlated systems. However, VQE still faces several challenges, mainly due to its inefficiency. In particular, it has been shown in "Identifying challenges towards practical quantum advantage through resource estimation: the measurement roadblock in the variational quantum eigensolver" by J. F. Gonthier et. al., arXiv:2012:04001 that the number of measurements required for useful applications, albeit scaling polynomially, can easily become intractable.

A Hermitian operator O associated with an observable quantity has a spectral decomposition, $O=\Sigma_m mP_m$, wherein $P_m$ is the projector onto the eigenspace of O with eigenvalue m. Upon measuring the quantum state represented by the state vector $|\psi\rangle$, the probability of getting the measurement outcome m is given by $p(m)=\langle\psi|_m|\psi\rangle$. In general it is not possible to measure the operator O directly in its eigenbasis. For example, if one is interested in finding a ground state of a Hamiltonian H, measuring in its eigenbasis requires solving the problem itself in advance.

Thus, one possible measurement protocol comprises writing the operator O as a sum of K Pauli strings $P_k$, $O=\Sigma_k c_k P_k$, wherein $$P_k=\bigotimes_{i=1}^{N}\sigma_{k_i}^{(i)}.$$

Here $$\sigma_0^{(i)}=\mathbb{1}$$

is the identity, $$\sigma_1^{(i)}=\sigma_x^{(i)}$$

is the Pauli x-matrix, $$\sigma_2^{(i)}=\sigma_y^{(i)}$$

is the Pauli y-matrix and $$\sigma_3^{(i)}=\sigma_z^{(i)}$$

is the Pauli z-matrix acting on the qubit $q_i$. Then, the expectation value of the operator O is determined by measuring the operators corresponding to the Pauli strings $P_k$ and by approximating the expectation value by the mean values of the measurement outcomes. While this method works in principle, it is far from being optimal, as the error in the estimation is given by $\epsilon=\sqrt{\Sigma_k|c_k|^2\mathrm{Var}(P_k)/S_k}$, $$\mathrm{Var}(P_k)=\langle P_k^2\rangle-\langle P_k\rangle^2$$

is the variance of the Pauli string $P_k$ and $S_k$ is the number of measurements used to estimate the term k. In particular, given such a measurement scheme, even an exact ground state of a Hamiltonian H does not enjoy the so-called zero-variance property, and statistical fluctuations always remain finite and large.

Thus, measurement schemes have been developed in the past which aim at solving the problems mentioned above. In WO 2021/099428 A1 an improved measurement scheme for the implementation of a variational quantum algorithm, e.g., a VQE algorithm, is disclosed. The measurement scheme is adapted to a qubit state encoding a paired-electron unitary coupled cluster with double excitations ansatz state. In EP 3 822 870 A1 expectation values of Pauli strings are measured for a first variational state encoded in a qubit system. The measured data is used to classically compute expectation values of a second variational state, wherein said second variational state is obtainable from the first variational state via the application of a fermionic linear unitary operator. While these measurement schemes are advantageous for these cases compared to a general measurement scheme, they are adapted to special classes of variational quantum algorithms and/or a special class of variational ansatz states encoded in a qubit system. Thus, it is not expected that these measurement schemes will also be beneficial for measuring the value of an observable quantity of an arbitrary quantum many-body system.

In "Learning to measure: adaptive informationally complete POVMs for near term-quantum algorithms" by Guillermo Garcia-Perez et al., arXiv:2104.00569v1, an adaptive measurement scheme using positive operator-valued measures (POVM) is proposed. This measurement scheme may also be used in the implementation of a VQE on a quantum computer. A POVM is a generalized measurement scheme which includes the measurement schemes introduced above. The adaptive measurement scheme requires adding one ancillary qubit to each qubit of the qubit register and applying a two-qubit unitary operation between the qubit of the register and the associated ancillary qubit. This measurement scheme has a large overhead in terms of quantum resources, since it leads to a doubling of the number of qubits. Moreover, the typically limited connectivity layout of Noisy Intermediate-Scale Quantum (NISQ) computers may not allow the direct coupling of the qubits of the register with the ancillary qubits, resulting in increased circuit depths and errors. Furthermore, the practical implementation of an arbitrary two-qubit gate requires the application of several quantum gates available in the experimental setup, and may thus be resource-intensive and error-prone.

It is therefore an objective of the present invention to provide a method for estimating a value of an observable quantity of a state of a quantum many-body system and an apparatus for carrying out said method which are better adapted to NISQ computers.

According to a first aspect of the present invention, there is provided a method for estimating a value of an observable quantity of a state of a quantum many-body system, said state being encodable as a qubit state of a register of N qubits via an encoding operation, said observable quantity being associated with a Hermitian operator O acting on the qubit register, wherein said method comprises:

Providing a register of N qubits;

Associating to each qubit $q_j$, j=1, . . . , N, an initial informationally complete local positive operator-valued measure representable by $M_j \geq 4$ positive operators $$\prod_{m_j}^{(j)}, m_j = 0, \ldots, M_j - 1$$

with respective measurement outcome $m_j$, the operators being parametrizable by an initial set of operator parameters;

Defining an estimator for said observable quantity and an associated statistical error function of said estimator as a function of said operator parameters and the possible measurement outcomes of the local positive operator-valued measures;

Iterating an adaptive measurement routine for optimizing the positive operators with respect to the statistical error function, wherein said adaptive measurement routine accepts said operator parameters as an input and comprises:

Implementing said informationally complete local positive operator-valued measures parametrized by the operator parameters received as an input on said qubit register to obtain a set of measurement data as an output; and Data processing said measurement data, wherein said data processing comprises calculating a first value of the statistical error function given said operator parameters and said measurement data and determining new operator parameters parametrizing an informationally complete local positive operator-valued measure for each qubit $q_j$ as an input for the next iteration of the adaptive measurement routine, wherein said new operator parameters result in a smaller second value of the statistical error function given said measurement data than the first value, wherein said iteration is repeated until a convergence rule is fulfilled;

Calculating a value of the estimator of the observable quantity given the measurement data and the operator parameters as an estimation of the value of the observable;

characterized in that implementing said informationally complete local positive operator-valued measures comprises for each round s of a given number S of rounds of measurements preparing the qubit register in an initial qubit state which is an encoding of said state of said quantum many-body system obtained via the encoding operation and applying a quantum circuit to said qubit state, said quantum circuit being representable as a quantum circuit which comprises only single-qubit operations determined by the operator parameters and projective measurements of the qubits onto the computational basis.

Within the framework of quantum mechanics, a state of a quantum many-body system may be described by a density operator ρ. The state of the quantum many-body system may be a pure state, i.e., $\rho=|\omega\rangle\langle\psi|$, or it may be a mixed state, i.e., $\rho=\Sigma_i p_i|\psi_i\rangle\langle\psi_i|$ wherein $|\psi\rangle$, resp. $|\psi_i\rangle$ is a state vector of a quantum system and $p_i \geq 0$, $\Sigma_i p_i=1$. The quantum body system of the method according to the first aspect of the present invention may be a spin system, a bosonic system or a fermionic system, but it is not limited to this.

According to the first aspect of the present invention the state of said quantum many-body system is encodable as a qubit state of a register of N qubits via an encoding operation. A qubit register of N qubits is a system comprising N qubits, called system qubits. It may be understood as the quantum analog of the classical processor register.

The state of the quantum many-body system may be a state of a qubit system. For example, the state may be a qubit state of a quantum computation. As the state of the quantum many-body system is already a qubit state, no encoding operation is necessary. The state may be a variational state of a variational quantum algorithm, e.g. the VQE. The variational state may be encoded as a qubit state.

The method comprises providing a register of N qubits. A qubit is a quantum mechanical two-level system. One of the two states of the two-level system may be described by a state vector $|0\rangle$, and the other state may be described by a state vector $|1\rangle$. The two state vectors are orthonormal. They span the linear vector space of the qubit. The two states are also called computational basis. The two states may be, e.g., the ground state and an excited state of a quantum mechanical system.

The method further comprises associating to each qubit $q_j$, j=1, . . . , N, an initial informationally complete local positive operator-valued measure (POVM) representable by $M_j \geq 4$ positive operators $$\prod_{m_j}^{(j)}, m_j = 0, \ldots, M_j - 1$$

with respective measurement outcome $m_j$, the operators being parametrizable by an initial set of operator parameters. The operators $$\prod_{m_j}^{(j)}$$

are also called effects of the POVM. The effects $$\prod_{m_j}^{(j)}$$

act on the qubit $q_j$.

A POVM is a defined by a set of positive operators $$\{\Pi_m\}_{m=0}^{M-1}$$

for which $$\sum_{m=0}^{M-1}\Pi_m = \mathbb{1}.$$

When said POVM is measured on the quantum state ρ, the probability to obtain the outcome m is given by $\mathrm{Tr}[\rho\Pi_m]$. A POVM is informationally complete when the effects span the associated operator space.

The effects of the informationally complete local POVM associated to the qubit $q_j$ may be linearly dependent. Then, $M_j>4$. The effects of the informationally complete local POVM associated to the qubit $q_j$ may also be linearly independent. Then, $M_j=4$. In this case, the POVM is minimal.

An informationally complete POVM allows the reconstruction of the expectation value of any observable quantity from its measurement outcomes. In particular, as each local POVM is informationally complete, each operator $Q_j$ acting on one of the qubits $q_j$ is representable as a linear combination of the effects of the corresponding local POVM, $$Q_j = \sum_{m_j=0}^{M_j-1} b_{jm_j}^{(j)} \Pi_{m_j}^{(j)}$$

with coefficients $$b_{jm_j}^{(j)}.$$

When the operator $Q_j$ is Hermitian, the coefficients $$b_{jm_j}^{(j)}$$

$b_{jm_j}^{(j)}$ are real. Furthermore, informationally complete data may also be used to reconstruct the density matrix describing the state of the quantum many-body system.

The method is adapted for measuring a value of an observable quantity. The observable quantity is not limited as long as it may be associated to the measurement of a Hermitian operator O. For example, the observable quantity may be the energy of the quantum many-body system. In this case, the associated Hermitian operator is the Hamiltonian of the system.

Within the mathematical framework of quantum mechanics, the value of an observable quantity of a state of a quantum mechanical system described by a density operator ρ is given by the expectation value $\langle O\rangle=\mathrm{Tr}[\rho O]$, where O is the Hermitian operator associated with the observable quantity. Due to the probabilistic nature of the theory of quantum mechanics, the expectation value is determined in practice by measuring the Hermitian operator O many times, and then calculating a value of an estimator given the obtained measurement data to obtain an estimate of the expectation value of O. The estimation is generally associated with a statistical error given by a statistical error function. The smaller the statistical error, the better is the approximation of the expectation value by the estimator and the obtained measurement data. Both the estimator and the statistical error function depend on the obtained measurement data and the underlying measurement scheme used to obtain said data. Thus, the method according to the first aspect of the present invention comprises defining an estimator for said observable quantity and an associated statistical error function of said estimator as a function of said operator parameters and the possible measurement outcomes of the local positive operator-valued measures.

As has been explained above, not every measurement scheme is optimal for measuring a specific Hermitian operator O, as the statistical error of the scheme may be large. Thus, the method according to the present invention further comprises iterating an adaptive measurement routine for optimizing the positive operators of the local POVMs with respect to the statistical error function. I.e., the adaptive measurement routine is used to determine local POVMs that allow to estimate the value of the observable quantity with a small statistical error.

To this end, the adaptive measurement routine accepts said operator parameters as an input, and comprises implementing said positive operator-valued measures parametrized by the operator parameters received as an input on said qubit register to obtain a set of measurement data as an output. The details on how the local POVMs are implemented will be given below.

The adaptive measurement routine further comprises data processing of the obtained measurement data. Said data processing comprises calculating a first value of the statistical error function given said operator parameters and said measurement data and determining new operator parameters parametrizing an informationally complete local positive operator-valued measure for each qubit $q_j$ as an input for the next iteration of the adaptive measurement routine. The new operator parameters are determined such that they result in a smaller second value of the statistical error function given said measurement data than the first value. The new operator parameters may be determined, e.g., via a gradient optimization of the statistical error function with respect to the operator parameters given the measurement data. The iteration of the adaptive measurement routine is repeated until a convergence rule is fulfilled.

In each iteration, only the operator parameters of one local POVM may be changed. Alternatively, the operator parameters of more than one local POVM may be changed in each iteration.

The method also comprises calculating a value of the estimator of the observable quantity given the measurement data and the operator parameters as an estimation of the value of the observable. This calculation may be performed after the iteration of the adaptive measurement routine is completed. The value of the estimator may be calculated using the measurement data obtained and the operator parameters used during the last iteration of the adaptive measurement routine. As each local POVM is informationally complete it is always possible to calculate a value of an estimator of the observable quantity.

Now, the implementation of the informationally complete local POVMs in the adaptive measurement routine will be explained. According to the method of the present invention, implementing said informationally complete local positive operator-valued measures comprises for each round s of a given number S of rounds of measurements preparing the qubit register in an initial qubit state which is an encoding of said state of said quantum many-body system obtained via the encoding operation. I.e., for each round s of the given number S of rounds of measurement, the initial qubit state is prepared in the qubit register. The state preparation may be achieved with current techniques in the field of state preparation in quantum computation applications. Then, a quantum circuit is applied to the prepared qubit state. A quantum circuit is representable by a collection of quantum gates and measurements applied to a qubit register. A quantum gate acting on k qubits is representable as a unitary transformation acting on the Hilbert space associated to the k qubits.

According to the method of the present invention, the quantum circuit is representable as a quantum circuit which comprises only single-qubit operations determined by the operator parameters and projective measurements of the qubits onto the computational basis. The single-qubit operations applied to the qubits may be the same for each round of measurement or they may be different for at least two rounds of measurements. A projective measurement onto the computational basis is described by the local projectors $|0\rangle\langle 0|$ and $|1\rangle\langle 1|$ of the qubit $q_j$ having basis states described by the state vectors $|0\rangle$ and $|1\rangle$.

A single-qubit operation may be represented as a unitary matrix acting on the single qubit state space spanned by the single qubit basis state vectors $$|0\rangle = \begin{pmatrix} 1 \\ 0 \end{pmatrix} \text{ and } |1\rangle = \begin{pmatrix} 0 \\ 1 \end{pmatrix}.$$

A possible representation is given by $$U(\varphi_0, \varphi_1, \varphi_2) = \begin{pmatrix} \cos(\varphi_0/2) & -e^{i\varphi_1}\sin(\varphi_0/2) \\ e^{i\varphi_2}\sin(\varphi_0/2) & e^{i(\varphi_1+\varphi_2)}\cos(\varphi_0/2) \end{pmatrix} \quad (1)$$

with real parameters $\varphi_0$, $\varphi_1$, $\varphi_2$. Thus, the operator parameters may comprise these parameters.

The quantum circuit may be realized using a gate-based quantum computing platform.

The method according to the first aspect of the present invention is based on the application of quantum circuits which comprise only single-qubit operations and projective measurements onto the computational basis. I.e., compared to the adaptive measurement scheme disclosed in arXiv: 2104.00569v1, no ancillary qubits and no two-qubit operations are required. This leads to a decrease in the amount of required quantum resources, as only a qubit register, which allows for the encoding of the state of the quantum many-body systems in N qubits, is necessary. I. e, compared to the method of arXiv:2104.00569v1, only half of the number of qubits is necessary. Furthermore, the method requires only single-qubit unitary operations which are simpler to implement and less noisy than two-qubit operations. Furthermore, the method is platform-independent, given that implementing single-qubit unitaries is a universal feature in NISQ computers. Furthermore, the method may be applied to any quantum state which is encodable in a register of qubits. Thus, this method may also be used for states of variational quantum algorithms, e. g. the Variational Quantum Eigensolver.

According to one example of the method of the present invention for at least one qubit $q_j$ the associated local positive operator-valued measure may be minimal, i.e. $M_j=4$. This requires a minimal number of effects for said qubit, and may thus lead to a minimal number of operator parameters. In this way, the adaptive measurement routine may require less resources compared to a POVM which is not minimal.

In one embodiment of the method according to the present invention, the informationally complete local positive operator-valued measure associated to at least one qubit $q_j$ may be representable by $2K_j$ positive operators $$\left\{\alpha_{k_j}^{(j)} U_{k_j}^{(j)\dagger} |x_j\rangle\langle x_j| U_{k_j}^{(j)}\right\}_{k_j=1,\ldots K_j, x_j=0,1},$$

$K_j \geq 3$, wherein $$\left\{\alpha_{k_j}^{(j)}\right\}_{k_j=1}^{K_j}$$

is a first probability distribution and $$\left\{U_{k_j}^{(j)}\right\}_{k_j=1}^{K_j}$$

is a set of single-qubit unitary operations, said local positive operator-valued measure being parametrizable by operator parameters defining the probabilities $$\alpha_{k_j}^{(j)}$$

of the first probability distribution and the single-qubit unitary operations, and wherein implementing said positive operator-valued measure for the qubit $q_j$ may comprise for each round s of the S rounds of measurements sampling a value $k_j \in [1, K_j]$ according to the first probability distribution $$\left\{\alpha_{k_j}^{(j)}\right\}_{k_j=1}^{K_j}$$

and applying the single-qubit unitary operation $$U_{k_j}^{(j)}$$

corresponding to the sampled value $k_j$ to the respective qubit $q_j$ followed by a projective measurement of said qubit $q_j$ onto the computational basis resulting in a measurement outcome $$x_j^{(s)} = 0 \text{ or } x_j^{(s)} = 1$$

in the s-th round of measurements.

In one special example of said embodiment, the informationally complete local positive operator-valued measure (POVM) associated to each of the qubits $q_j$ may be representable by operators $$\left\{\alpha_{k_j}^{(j)}U_{k_j}^{(j)\dagger}|x_j\rangle\langle x_j|U_{k_j}^{(j)}\right\}_{k_j=1,\ldots K_j,x_j=0,1}.$$

The respective first probability distributions and the respective sets of single-qubit unitary operations may be the same for all qubits or they may be different for at least two qubits. In particular, they may be different for all qubits.

The sampling of the value $k_j$ may be performed before the S rounds of measurement are carried out, or it may be performed during the S rounds of measurements. The sampling may be carried out, e. g., by using a classical computer.

For the qubit $q_j$, the application of the quantum circuit according to this embodiment indeed implements the POVM represented by the operators $$\left\{\alpha_{k_j}^{(j)}U_{k_j}^{(j)\dagger}\left|x_j\rangle\langle x_j\right|U_{k_j}^{(j)}\right\}_{k_j=1,\ldots K_j,x_j=0,1},$$

as may be understood from the following:

For the s-th round of measurement a value $k_j \in [1, K_j]$ is sampled according to the probability distribution $$\left\{\alpha_{k_j}^{(j)}\right\}_{k_j=1}^{K_j},$$

and then the single-qubit unitary operation $$U_{k_j}^{(j)}$$

with the sampled index $k_j$ is applied to the qubit q followed by a projective measurement of said qubit $q_1$ onto the computational basis. I, e., a randomly sampled single-qubit operation is applied to the qubit $q_j$ followed by a projective measurement onto the computational basis states $$\{|x_j\rangle\langle x_j|\}_{x_j=0}^{1} = \{|0\rangle\langle 0|, |1\rangle\langle 1|\}$$

of the qubit $q_j$. This is equivalent to a projective measurement with projectors $$\pi_{k_j,0} = U_{k_j}^{(j)\dagger}|0\rangle\langle 0|U_{k_j}^{(j)} \text{ and } \pi_{k_j,1} = U_{k_j}^{(j)\dagger}|1\rangle\langle 1|U_{k_j}^{(j)}.$$

Due to the sampling, different single-qubit unitary operations may be applied in different rounds of measurement. S rounds of measurements result, for the qubit $q_j$, in the implementation of a local POVM described by the effects $$\left\{\alpha_{k_j}^{(j)}U_{k_j}^{(j)\dagger}|x_j\rangle\langle x_j|U_{k_j}^{(j)}\right\}_{k_j=1,\ldots K_j,x_j=0,1}.$$

The probability to obtain the outcome $(k_j, x_j)$ is given by $$p_{k_j,x_j} = Tr\left[\alpha_{k_j}^{(j)}\pi_{k_j,x_j}\rho_j\right],$$

wherein $\rho_j$ is the reduced density operator of the state of the qubit $q_j$. Since $K_j \geq 3$, it may be ensured that the local POVM is informationally complete.

Each first probability distribution $$\left\{\alpha_{k_j}^{(j)}\right\}_{k_j=1}^{K_j}$$

may be parametrized by $K_j-1$ parameters $\phi_i \in [0, \pi/2]$ via $$\left\{\alpha_{k_j}^{(j)} = y_{k_j}^2\right\}_{k_j=1}^{K_j},$$

where $y_1=\cos(\phi_1)$, $y_2=\sin(\phi_1)\cos(\phi_2)$, . . . , $y_{K_j-1}=\sin(\phi_1)\sin(\phi_2)\ldots\sin(\phi_{K_j-2})\cos(\phi_{K_j-1})$, $y_{K_j}=\sin(\phi_1)\sin(\phi_2)\ldots\sin(\phi_{K_j-2})\sin(\phi_{K_j-1})$, and each single-qubit unitary operation $$U_{k_j}^{(j)}$$

may be parameterized by three real parameters $$\varphi_0^{(k_j)}, \varphi_1^{(k_j)} \text{ and } \varphi_2^{(k_j)}$$

according to Equation (1). Thus, each local POVM is parametrizable by $4K_j-1$ operator parameters. The operator parameters are updated in the adaptive measurement routine.

By using post-processing of the measurement outcomes $$x_j^{(s)}$$

obtained via the embodiment of the method explained above it is possible to implement further POVMs.

In one embodiment, the informationally complete local positive operator-valued measure associated to at least one qubit $q_j$ may be representable by $M_j \geq 4$ positive operators $$\prod\nolimits_{m_j}^{(j)} = \sum\nolimits_{k_j=1}^{K_j}\sum\nolimits_{x_j=0}^{1}P^{(j)}(m_j|k_j, x_j)\alpha_{k_j}^{(j)}U_{k_j}^{(j)\dagger}|x_j\rangle\langle x_j|U_{k_j}^{(j)},$$

wherein $$\left\{\{P^{(j)}(m_j|k_j, x_j)\}_{m_j=0,\ldots,M_j-1}\right\}_{k_j=1,\ldots,K_j;x_j=0,1}$$

is a set of $2K_j$ $M_j$-outcome conditional second probability distributions, said operator parameters further comprising parameters defining the probabilities $P^{(j)}(m_j|k_j,x_j)$, and implementing said positive operator-valued measure may comprise post-processing of the measurement outcome $x_j$, wherein said post-processing comprises sampling a value $m_j \in [0, M_j-1]$ according to the second probability distribution $P^{(j)}(m_j|k_j,x_j)$ with $k_j$ being the sampled index of the applied single-qubit unitary operation and relabeling the measurement outcome $x_j$ as $m_j$.

Thus, for the qubit $q_j$, the local POVM representable by the effects $$\prod_{m_j}^{(j)} = \sum_{k_j=1}^{K_j} \sum_{x_j=0}^{1} P^{(j)}(m_j|k_j, x_j)\alpha_{k_j}^{(j)} U_{k_j}^{(j)\dagger} |x_j\rangle\langle x_j| U_{k_j}^{(j)}$$

is implemented as follows: For the s-th round of measurement, the qubit register is prepared in the initial qubit state. A value $k_j \in [1, K_j]$ is sampled according to the probability distribution $$\{\alpha_{k_j}^{(j)}\}_{k_j=1}^{K_j},$$

and the single-qubit unitary operation $$U_{k_j}^{(j)}$$

with the sampled value $k_j$ is applied to the qubit $q_j$ followed by a projective measurement of said qubit $q_j$ onto the computational basis. This results in a measurement outcome $x_j$ for the respective qubit $q_j$. This measurement outcome is thus obtained using quantum computational means. Then, the measurement outcome is post-processed. The post-processing may be carried out with the help of a classical computer. To this end, a value $m_j \in [0, M_j-1]$ is sampled according to the second probability distribution $P^{(j)}(m_j|k_j, x_j)$, wherein $x_j$ is the respective measurement outcome and $k_j$ is the index of the applied single-qubit unitary operation. These informationally complete POVMs are disclosed, e. g., in "Simulating positive operator-valued measures with projective measurements" by M. Oszmaniec et al., Physical Review Letters, 119, 190501 (2017).

The operator parameters parametrizing this local POVM may be as follows: Each probability distribution $$\{\alpha_{k_j}^{(j)}\}_{k_j=1}^{K_j}$$

may be parametrized by $K_j-1$ parameters $\phi_i \in [0, \pi/2]$ as explained above, and each set of single-qubit unitary operations may be parametrized by 3 parameters $$\varphi_0^{(k_j)}, \varphi_1^{(k_j)} \text{ and } \varphi_2^{(k_j)}$$

as explained above. Furthermore, each second probability distribution $P^{(j)}(m_j|k_j, x_j)$ may be parametrized for fixed $k_j$, $x_j$ by $(M_j-1)$ angles $$\gamma_{k_j,x_j}^{n_j} \in [0, \pi/2] \text{ via } \left\{P^{(j)}(m_j|k_j, x_j) = \left(z_{k_j,x_j}^{m_j}\right)^2\right\}_{m_j=0}^{M_j-1},$$

wherein $$z_{k_j,x_j}^{0} = \cos\left(\gamma_{k_j,x_j}^{0}\right),$$

$$z_{k_j,x_j}^{1} = \sin\left(\gamma_{k_j,x_j}^{0}\right)\cos\left(\gamma_{k_j,x_j}^{1}\right), \ldots,$$

-continued $$z_{k_j,x_j}^{M_j-2} = \sin\left(\gamma_{k_j,x_j}^{0}\right)\sin\left(\gamma_{k_j,x_j}^{1}\right) \ldots \sin\left(\gamma_{k_j,x_j}^{M_j-3}\right)\cos\left(\gamma_{k_j,x_j}^{M_j-2}\right),$$

$$z_{k_j,x_j}^{M_j-1} = \sin\left(\gamma_{k_j,x_j}^{0}\right)\sin\left(\gamma_{k_j,x_j}^{1}\right) \ldots \sin\left(\gamma_{k_j,x_j}^{M_j-3}\right)\sin\left(\gamma_{k_j,x_j}^{M_j-2}\right).$$

Thus, the local POVM may be parametrizable by $2K_j(M_j+1)-1$ operator parameters.

These local POVMs are generally non-projective POVMs. If one chooses $M_j=4$ one may be able to ensure that the local POVM is a minimal informationally complete POVM.

In one special example of said embodiment, the informationally complete local POVM associated to each of the qubits q; may be representable by $M_j \geq 4$ positive operators $$\prod_{m_j}^{(j)} = \sum_{k_j=1}^{K_j} \sum_{x_j=0}^{1} P^{(j)}(m_j|k_j, x_j)\alpha_{k_j}^{(j)} U_{k_j}^{(j)\dagger} |x_j\rangle\langle x_j| U_{k_j}^{(j)}.$$

The respective first probability distributions, the respective second probability distributions and the respective sets of single-qubit unitary operations may be the same for all qubits or they may be different for at least two qubits. In particular, they may be different for all qubits.

In one possible embodiment of the present invention, implementing said positive operator-valued measures may comprise sampling, for the at least one qubit $q_j$, S values $$k_j^{(1)}, \ldots, k_j^{(s)} \in [1, K_j]$$

according to the first probability distribution $$\{\alpha_{k_j}^{(j)}\}_{k_j=1}^{K_j}$$

and defining a batch of S quantum circuits, wherein in the s-th quantum circuit the single-qubit unitary operation $$U_{k_j^{(s)}}^{(j)}$$

with the sampled value $$k_j^{(s)}$$

is applied to the qubit $q_j$ followed by a projective measurement of said qubit onto the computational basis, and implementing said positive operator-valued measure further comprises applying the s-th quantum circuit in the s-th round of the measurement routine. Such an embodiment may be particularly useful when the qubit register is part of a quantum computing platform which is only remotely accessible. Then, the sampling of the values $k_j$ may be performed, e.g., on a classical computer. Furthermore, the batch of quantum circuits may be defined using a classical computer. The batch of quantum circuits may then be sent to the location of a quantum computer, where the quantum circuits are applied one by one to the initial qubit state.

The method according to the first aspect of the present invention comprises computational steps that may be carried out on a quantum computer by using a register of qubits and applying a quantum circuit to said qubit register. Furthermore, the method according to the first aspect of the present invention comprises further computational steps, like data processing of the measurement data, calculating a value of an estimator or post-processing as explained above. In one embodiment of the method according to the first aspect of the present invention, said post-processing and/or said data processing and/or said calculating of a value of the estimator may be carried out using a classical computing system. The classical computing system may comprise, but is not limited to, a central processing unit (CPU), a graphical processing unit (GPU), application-specific integrated circuits (ASICS) and a field-programmable gate array (FPGA). However, the method is not limited to this, and these computational steps may also be carried out by another means, e.g., by using a quantum computer.

In one embodiment of the method according to the present invention, said convergence rule may be fulfilled when the first value of the statistical error function is smaller than a first threshold value. The first threshold value may be determined in advance. Alternatively, the convergence rule may be fulfilled when the first value of the statistical error function is the same value to some accuracy for a given number of iterations.

The method of the first aspect of the present invention comprises calculating the value of an estimator of the observable quantity. In one embodiment, said data processing may comprise calculating the value of the estimator of the observable quantity. I.e., a value of the observable quantity may be calculated at each iteration of the adaptive measurement routine. Alternatively, the value of the estimator may only be calculated once the convergence rule is fulfilled.

In one embodiment of the method according to the present invention, an i-th iteration of said adaptive measurement routine may comprise defining an initial average value of the estimator $\overline{O}_{av,i}$ and an initial average value of the associated statistical error function $\overline{E}_{av,i}$, said initial average value of the estimator being the value $\overline{O}_i$ of the estimator and the initial average value of the statistical error function being the first value $\overline{E}_i$ of the statistical error function calculated in the i-th iteration of the adaptive measurement routine, and wherein for each iteration g>i, said measurement routine may comprise defining a new average value of the estimator $\overline{O}_{av,g}=(\overline{O}_g\overline{E}_{av,g-1}+\overline{O}_{av,g-1}\overline{E}_g)/(\overline{E}_g+\overline{E}_{av,g-1})$ and a new average value of the statistical error function $\overline{E}_{av,g}=\overline{E}_{av,g-1}\overline{E}_g/(\overline{E}_{av,g-1}+\overline{E}_g)$, wherein $\overline{O}_g$ is the value of the estimator and $\overline{E}_g$ is the value of the statistical error function calculated in the g-th iteration, and wherein the final estimated value of the observable quantity may be defined as the new average value of the estimator once the convergence rule is fulfilled. This embodiment of the method according to the first aspect of the present invention uses the intermediate values of the estimator and the statistical error function to calculate a weighted average such that the resulting statistical error is minimized. In this way, all measurement results obtained during the intermediate POVM optimization steps are used for the construction of the estimated value of the observable quantity. More details regarding this optimization are disclosed in arXiv:2104.00569v1, Chapter III C, the entire content of which is incorporated by reference.

For the embodiment described above, said convergence rule may be fulfilled when the new average value of the statistical error function is smaller than a second threshold value.

The method according to the first aspect of the present invention requires calculating the value of an estimator of the observable quantity. In one embodiment, said Hermitian operator associated to said observable O may be decomposable in terms of Pauli operators, $$O = \sum_{i_1,\ldots,i_N=0}^{3} c_{i_1\ldots i_N}\sigma_{i_1}^{(1)}\otimes \ldots \otimes\sigma_{i_N}^{(N)},$$

with $$\sigma_{i_j}^{(j)}$$

being a Pauli operator acting on the qubit $q_j$, said Pauli operator being representable as $$\sigma_{i_j}^{(j)} = \sum_{m_j=0}^{M_j-1} b_{i_j m_j}^{(j)}\prod\nolimits_{m_j}^{(j)},$$

and the estimator may be a function of $$\omega_{m_1\ldots m_N} = \sum_{i_1,\ldots,i_N=0}^{3} c_{i_1\ldots i_N} b_{i_1 m_1}^{(1)} \ldots b_{i_N m_N}^{(N)},$$

wherein $m_j$ is the measurement outcome of the implementation of the local positive operator-valued measure associated to the qubit $q_j$, and in particular the estimator may be of the form $$\overline{O} = \frac{1}{S}\sum_{s=1}^{S}\omega_{m_1^{(s)}\ldots m_N^{(s)}},$$

wherein $$m_j^{(s)}$$

is the outcome of the s-t round of measurement.

This estimator may be understood as follows: As the local POVMs associated to the qubits of the register are all informationally complete, it is always possible to represent the Pauli operators $$\sigma_{i_j}^{(j)}$$

acting on the qubit $q_j$ via the effects of the local POVM according to $$\sigma_{i_j}^{(j)} = \sum_{m_j=0}^{M_j-1} b_{i_j m_j}^{(j)}\prod\nolimits_{m_j}^{(j)}$$

with coefficients $$b_{i_j m_j}^{(j)}.$$

Thus, the expectation value of the operator O for the quantum state ρ may be rewritten as ⟨O⟩=Tr[ρO]=

$$\sum_{m_1,\ldots,m_N}\omega_{m_1\ldots m_N}Tr\left[\rho\otimes_{j=1}^{N}\prod_{m_j}^{(j)}\right]=\sum_{m_1,\ldots,m_N}\omega_{m_1\ldots m_N}p_{m_1\ldots m_N},$$

wherein $p_{m_1 \ldots m_N}$ is the probability to obtain the measurement outcome $(m_1, \ldots, m_N)$. Implementing the local POVMs via iteratively applying a quantum circuit to the initial qubit state corresponds to sampling from the probability distribution $\{p_{m_1 \ldots m_N}\}$ resulting in a sequence of outcomes $$\left(m_1^{(s)}\ldots m_N^{(s)}\right)$$

for the s-th round of measurement, and an estimator of the observable O is given by $$\overline{O}=\frac{1}{S}\sum_{s=1}^{S}\omega_{m_1^{(s)}\ldots m_N^{(s)}}.$$

Each term $$\omega_{m_1^{(s)}\ldots m_N^{(s)}}$$

is calculable in polynomial time in the number of Pauli strings on a classical computer. In this way, the weighted average of all Pauli strings is estimated simultaneously by exploiting the informationally complete data obtained from the application of the informationally complete POVM. In this way, state tomography which requires a number of measurements which is exponential in in the number of qubits and which requires storing data representing an exponentially large density matrix is prevented.

Given the estimator above, the statistical error function may be a function of the second moment of $\omega_{m_1 \ldots m_N}$ over the probability distribution $\{p_{m_1 \ldots m_N}\}$ to obtain the measurement outcome $(m_1, \ldots, m_N)$. For example, the statistical error function may be a function of the variance of $\omega_{m_1 \ldots m_N}$ over the probability distribution $\{p_{m_1 \ldots m_N}\}$. In one example, the statistical error function may be the variance of $\omega_{m_1 \ldots m_N}$ over the probability distribution $\{p_{m_1 \ldots m_N}\}$ For example, the statistical error function may be of the form $$\overline{E}=\frac{1}{S}\sum_{s=1}^{S}\omega^2_{m_1^{(s)}\ldots m_N^{(s)}}-\left(\frac{1}{S}\sum_{s=1}^{S}\omega_{m_1^{(s)}\ldots m_N^{(s)}}\right)^2.$$

The method according to the first aspect of the present invention may be used for any state of a quantum many-body system that is encodable in a qubit state of a register of N qubits. In one embodiment, said quantum many-body system may be describable by a fermionic Hamiltonian of N modes, in particular by a Hamiltonian of the form $$H_f=\sum_{p,q=1}^{N}h_{pq}a_p^\dagger a_q+\frac{1}{2}\sum_{p,q,r,s=1}^{N}u_{pqrs}a_p^\dagger a_q^\dagger a_r a_s,$$

wherein $$a_p^\dagger$$

is a fermionic creation operator creating a fermionic particle in mode p, and $a_p$ is the corresponding fermionic annihilation operator. Such Hamiltonians are well known, e.g., in the field of condensed matter physics, solid state physics and quantum chemistry, and they are used to describe, among others, strongly interacting fermionic quantum many-body systems, like superconductors and Mott insulators as well as molecules. Furthermore, such Hamiltonians are of importance in the field of drug design and the modelling of proteins.

In the case that said quantum many-body system is a fermionic system said encoding operation may be the Jordan-Wigner transformation or the Bravyi-Kitaev mapping or the JKMN mapping or the Parity mapping, but it is not limited to one of these mappings. The JKMN mapping is disclosed in Z. Ziang, A. Kalev, W. Mruczkiewicz and H. Neven "Optimal fermion-to-qubit mapping via ternary trees with applications to reduced quantum state learning", Quantum 4, 276 (2020), the entire content of which is incorporated herein by reference. The Bravyi-Kitaev mapping is disclosed in "Fermionic quantum computation" by S. Bravyi and A. Kitaev, Annals of Physics, Vol. 298, Iss. 1 (2002), pp. 210-226, the entire content of which is incorporated herein by reference. The Parity mapping is disclosed in "The Bravyi-Kitaev transformation for quantum computation of electronic structure", by J. Seeley et al, J. Chem. Phys. 137, 224109 (2012), the entire content of which is incorporated by reference.

The qubit register used in the method according to the present invention may be any qubit system which allows for state preparation, the application of single-qubit operations and projective measurements. I. e., the method according to the first aspect of the present invention is implementable on different quantum computing platforms. In one embodiment, the qubits may be superconducting qubits. In this case, the method may be particularly useful, as quantum computation platforms with superconducting qubits may not allow the direct coupling of the qubits of the register with ancillary qubits. In other embodiments, the qubits may be ion qubits, or they may be photonic qubits. However, the invention is not limited to one of the qubits mentioned above.

According to a second aspect of the present invention, there is provided an apparatus for estimating a value of an observable quantity of a state of a quantum many-body system, said state being encodable as a qubit state of a register of N qubits via an encoding operation, said observable quantity being associated with a Hermitian operator O acting on the qubit register, wherein said apparatus comprises:

A register of N qubits;

State preparation means for preparing the qubit register in an initial qubit state which is an encoding of said state of said quantum many-body system obtained via the encoding operation;

Means for applying a quantum circuit to said qubit register, wherein said quantum circuit is representable as a quantum circuit which comprises only single-qubit operations and projective measurements of the qubits onto the computational basis;

Data processing means;

Control means, said control means being operative to iterate an adaptive measurement routine for optimizing positive operators with respect to a statistical error function, wherein said positive operators are defined by associating to each qubit $q_j$, j=1, . . . , N, an initial informationally complete local positive operator-valued measure representable by $M_j \geq 4$ positive operators $$\prod_{m_j}^{(j)},$$

$m_j=0, \ldots, M_j-1$ with respective measurement outcome $m_j$, the positive operators being parametrizable by an initial set of operator parameters and the statistical error function is given by defining an estimator for said observable quantity and an associated statistical error function of said estimator as a function of said operator parameters and the possible measurement outcomes of the local positive operator-valued measures;

wherein said adaptive measurement routine accepts said operator parameters as an input and comprises:

Implementing said positive operator-valued measures parametrized by the operator parameters received as an input on said qubit register to obtain a set of measurement data as an output, wherein implementing said positive operator-valued measures comprises for each round s of a given number S of rounds of measurements preparing the qubit register in an initial qubit state which is an encoding of said state of said quantum many-body system obtained via the encoding operation by using said state preparation means and applying a quantum circuit to said qubit state using said means for applying a quantum circuit, said quantum circuit being representable as a quantum circuit which comprises only single-qubit operations determined by the operator parameters and projective measurements of the qubits onto the computational basis;

Data processing said measurement data using said data processing means, wherein said data processing comprises calculating a first value of the statistical error function given said operator parameters and said measurement data and determining new operator parameters parametrizing an informationally complete local positive operator-valued measure for each qubit $q_j$ as an input for the next iteration of the measurement routine, wherein said new operator parameters result in a smaller second value of the statistical error function given said measurement data than the first value, wherein said iteration is repeated until a convergence rule is fulfilled;

Means for calculating a value of the estimator of the observable quantity given the measurement data and the operator parameters as an estimation of the value of the observable.

The apparatus according to the second aspect of the present invention is thus adapted to carry out the method according to the first aspect of the present invention. Everything that was said above in relation to the method also applies to the apparatus.

The means for calculating a value of the estimator may be or may comprise the data processing means, or the data processing means may comprise the means for calculating a value of the estimator. The means for calculating a value of the estimator and/or the data processing means may be a classical computing system. Thus, the apparatus according to the present invention may comprise a hybrid of a classical computing system and a quantum computer.

According to a third and broader aspect of the invention, there is provided a method for estimating a value of an observable quantity of a state of a quantum many-body system, said state being encodable as a qudit state of a register of N qudits via an encoding operation, the qudits being quantum-mechanical d-level systems, said observable quantity being associated with a Hermitian operator O acting on the qudit register, wherein said method comprises:

Providing a register of N qudits, and dividing the N qudits in a partition of at least two subsets $S_j$ of qudits, j=1, . . . , J, J≥2, wherein the j-th subset contains $N_j \geq 1$ qudits, and wherein preferably each subset $S_j$ contains one qudit, i. e., J=N and $N_j=1$ for all j=1, . . . , J;

Associating to each subset $S_j$ of qudits an initial informationally complete local positive operator-valued measure representable by $$M_j \geq D_j^2$$

positive operators $$\prod_{m_j}^{(j)},$$

$m_j=0, \ldots, M_j-1$ with respective measurement outcome $m_j$, wherein $D_j$ is the dimension of the Hilbert space associated to the subset $S_j$ of qudits, the operators being parametrizable by an initial set of operator parameters;

Defining an estimator for said observable quantity and an associated statistical error function of said estimator as a function of said operator parameters and the possible measurement outcomes of the local positive operator-valued measures;

Iterating an adaptive measurement routine for optimizing the positive operators with respect to the statistical error function, wherein said adaptive measurement routine accepts said operator parameters as an input and comprises:

Implementing said informationally complete local positive operator-valued measures parametrized by the operator parameters received as an input on said qudit register to obtain a set of measurement data as an output;

Data processing said measurement data, wherein said data processing comprises calculating a first value of the statistical error function given said operator parameters and said measurement data and determining new operator parameters parametrizing an informationally complete local positive operator-valued measure for each subset of qudits S as an input for the next iteration of the adaptive measurement routine, wherein said new operator parameters result in a smaller second value of the statistical error function given said measurement data than the first value, wherein said iteration is repeated until a convergence rule is fulfilled;

Calculating a value of the estimator of the observable quantity given the measurement data and the operator parameters as an estimation of the value of the observable;

characterized in that implementing said informationally complete local positive operator-valued measures comprises for each round s of a given number S of rounds of measurements preparing the qudit register in an initial qudit state which is an encoding of said state of said quantum many-body system obtained via the encoding operation and applying a quantum circuit to said qudit state, said quantum circuit being representable as a quantum circuit which comprises only local unitary operations acting locally on the individual subsets $S_j$ of qudits, $U=U_1 \otimes \ldots \otimes U_J$, wherein $U_j$ acts on the subset $S_j$ of qudits and is determined by the operator parameters, and projective measurements of the qudits onto a local basis of each of the subsets $S_j$ of qudits, the local basis for the subset $S_j$ being described by state vectors $|x_j\rangle$, $x_j=0, \ldots, D_j-1$.

According to the third aspect of the present invention, the state of said quantum many-body system is encodable as a qudit state of a register of N qudits via an encoding operation. A qudit register of N qudits is a system comprising N qudits, called system qudits. The state of the quantum many-body system may be a state of a qudit system. For example, the state may be a qudit state of a quantum computation. As the state of the quantum many-body system is already a qudit state, no encoding operation is necessary. The state may be a variational state of a variational quantum algorithm, for example the VQE. The variational state may be encoded as a qudit state.

The method comprises providing a register of N qudits. A qudit is a quantum mechanical d-level system, with $d\geq 2$. For $d=2$, the qudit is a qubit.

According to the method of the third aspect, the qudits are divided in a partition of at least two subsets $S_j$ of qudits, $j=1, \ldots, J$, $J\geq 2$, wherein the j-th subset S; contains $N_j\geq 1$ qudits, and wherein preferably each subset $S_j$ contains one qudit, i. e., J=N and N; =1 for all $j=1, \ldots, J$. The partition of the N qudits is a grouping of the N qudits into the non-empty subsets $S_j$ in such a way that every qudit is included in exactly one subset.

The method according to the third aspect further comprises associating to each subset $S_j$ of qudits an informationally complete local positive operator-valued measure representable by $M_j\geq D_j^2$ positive operators $$\prod_{m_j}^{(j)},$$

$m_j=0, \ldots, M_j-1$ with respective measurement outcome $m_j$, wherein $D_j$ is the dimension of the Hilbert space associated to the subset $S_j$ of qudits, the operators being parametrizable by an initial set of operator parameters. The operators $$\prod_{m_j}^{(j)}$$

are called effects. I. e., according to the method, the effects $$\prod_{m_j}^{(j)}$$

$\Pi_{m_j}^{(j)}$ of the local POVM act only on the qudits of the respective subset $S_j$. As each local POVM is informationally complete, each operator $O_j$ acting on one subset $S_j$ of qudits is representable as a linear combination of the effects of the corresponding local POVM, $$O_j=\sum_{m_j=0}^{M_j-1} b_{jm_j}^{(j)} \prod_{m_j}^{(j)}$$

with coefficients $$b_{jm_j}^{(j)}.$$

When the operator $O_j$ is Hermitian, the coefficients $$b_{jm_j}^{(j)}$$

are real.

When all of the N qudits are qubits and each subset $S_j$ contains exactly one qubit, the method according to the third aspect of the present invention corresponds to the method according to the first aspect of the present invention. Thus, everything that was said above in relation to the method according to the first aspect of the present invention also applies analogously to the method according to the third aspect of the present invention. In particular, the observable quantity is not limited as long as it may be associated to a Hermitian operator O.

As has been explained above in relation to the first aspect of the present invention, within the mathematical framework of quantum mechanics, the value of an observable quantity of a state of a quantum mechanical system described by a density operator $\rho$ is given by the expectation value $\langle O\rangle=\mathrm{Tr}[\rho O]$, where O is the Hermitian operator associated with the observable quantity. Due to the probabilistic nature of the theory of quantum mechanics, the expectation value is determined in practice by measuring the Hermitian operator O many times, and then calculating a value of an estimator given the obtained measurement data to obtain an estimate of the expectation value of O. The estimation is generally associated with a statistical error given by a statistical error function. The smaller the statistical error, the better is the approximation of the expectation value by the estimator and the obtained measurement data. Both the estimator and the statistical error function depend on the obtained measurement data and the underlying measurement scheme used to obtain said data. Thus, the method according to the third aspect of the present invention comprises defining an estimator for said observable quantity and an associated statistical error function of said estimator as a function of said operator parameters and the possible measurement outcomes of the local positive operator-valued measures.

As has been explained above, not every measurement scheme is optimal for measuring a specific Hermitian operator O, as the statistical error of the scheme may be large. Thus, the method according to the third aspect of the present invention further comprises iterating an adaptive measurement routine for optimizing the positive operators of the local POVMs with respect to the statistical error function. I.e., the adaptive measurement routine is used to determine local POVMs that allow to estimate the value of the observable quantity with a small statistical error.

To this end, the adaptive measurement routine accepts said operator parameters as an input, and comprises implementing said positive operator-valued measures parametrized by the operator parameters received as an input on said qudit register to obtain a set of measurement data as an output. The details on how the local POVMs are implemented will be given below.

The adaptive measurement routine further comprises data processing of the obtained measurement data. Said data processing comprises calculating a first value of the statistical error function given said operator parameters and said measurement data and determining new operator parameters parametrizing an informationally complete local positive operator-valued measure for each set $S_j$ of qudits as an input for the next iteration of the adaptive measurement routine. The new operator parameters are determined such that they result in a smaller second value of the statistical error function given said measurement data than the first value. The new operator parameters may be determined, e.g., via a gradient optimization of the statistical error function with respect to the operator parameters given the measurement data. The iteration of the adaptive measurement routine is repeated until a convergence rule is fulfilled.

In each iteration, only the operator parameters of one local POVM may be changed. Alternatively, the operator parameters of more than one local POVM may be changed in each iteration.

The method also comprises calculating a value of the estimator of the observable quantity given the measurement data and the operator parameters as an estimation of the value of the observable. This calculation may be performed after the iteration of the adaptive measurement routine is completed. The value of the estimator may be calculated using the measurement data obtained and the operator parameters used during the last iteration of the adaptive measurement routine. As each local POVM is informationally complete it is always possible to calculate a value of an estimator of the observable quantity.

Now, the implementation of informationally complete local POVMs in the adaptive measurement routine will be explained. According to the third aspect of the method according to the present invention, implementing said informationally complete local positive operator-valued measures comprises for each round s of a given number S of rounds of measurements preparing the qudit register in an initial qudit state which is an encoding of said state of said quantum many-body system obtained via the encoding operation and applying a quantum circuit to said qudit state, said quantum circuit being representable as a quantum circuit which comprises only local unitary operations acting locally on the individual subsets $S_j$ of qudits, $U=U_1\otimes \ldots \otimes U_J$, wherein $U_j$ acts on the subset $S_j$ of qudits and is determined by the operator parameters, and projective measurements of the qudits onto a local basis of each of the subsets $S_j$ of qudits, the local basis for the subset $S_j$ being described by state vectors $|x_j\rangle$, $x_j=0, \ldots, D_j-1$. I. e., for each round s of the given number S of rounds of measurements, the initial qudit state is prepared in the qudit register. The state preparation may be achieved by using state preparation means. Then, a quantum circuit is applied to the prepared qudit state. The quantum circuit is representable as a quantum circuit which comprises only unitary operations acting locally on the individual subsets $S_j$ of qudits. I. e., the quantum circuit may be represented as a unitary which is of the form, $U=U_1\otimes \ldots \otimes U_J$, wherein $U_j$ acts on the subset $S_j$ of qudits and is determined by the operator parameters. The quantum circuit may be applied by means for applying a quantum circuit. As has been explained above, a quantum circuit is representable as a collection of quantum gates and measurements applied to the qudit register. In one non-limiting example, the unitary operation U may be applied by quantum gate application. In particular, each local unitary operation $U_j$ may be realized by an application of a sequence of single-qubit gates and two-qubit gates. The local unitary operations acting locally on the individual subsets $S_j$ may be the same for each round of measurement, or they may be different for at least two rounds of measurements. Every local unitary operation $U_j$ may be a realization of a unitary matrix acting on the Hilbert space of the associated set $S_j$ of qudits and being parametrized by real parameters. The operator parameters may comprise these parameters.

The quantum circuit further comprises projective measurements of the qudits onto a local basis of each of the subsets $S_j$ of qudits, the local basis for the subset $S_j$ being described by state vectors $|x_j\rangle$, $x_j=0, \ldots, D_j-1$. A projective measurement onto the local basis may be realized by measurement means. The local basis may be the computational basis in one example.

The quantum circuit may be realized using a gate-based quantum computer.

The method according to the third aspect of the present invention has the same advantages as the method according to the first aspect of the present invention. I. e., compared to the adaptive measurement scheme disclosed in arXiv:2104.00569v1, no ancillary qudits and no non-local qudit operations acting on more than one subset $S_j$ of qudits are required. This leads to a decrease in the amount of the required quantum resources, as only a qudit register which allows for the encoding of the state of the quantum many-body systems in N qudits is necessary. I e., compared to a generalization of the method of arXiv:2104.00569v1 to qudits, only half of the number of qudits is necessary. Furthermore, the method requires only local unitary operations which are simpler to implement and less noisy than unitary operations acting on at least two subsets $S_j$ of qudits. The local unitary operations may further be implemented efficiently by the application of single qubit operations and two qubit gates. Thus, the method is platform-independent, given the fact that these operations are a universal feature in NISQ computers. Furthermore, the method may be applied to any quantum state which is encodable in a register of qudits. Thus, this method may also be used for states of variational quantum algorithms, e. g., the Variational Quantum Eigensolver.

According to one example of the method according to the third aspect of the present invention, for at least one subset $S_j$ of qudits the associated local positive operator valued measure may be minimal. I. e., when $D_j$ is the dimension of the Hilbert space associated to the subset $S_j$ of qudits, then the number $M_j$ of the associated local Positive Operator Valued Measure is $M_j=D_j$. In this way, the number of operator parameters may be minimized. In this way, the adaptive measurement routine may require less resources compared to a POVM which is not minimal.

In one further embodiment of the method according to the third aspect of the present invention, the informationally complete local positive operator-valued measure associated to at least one set $S_j$ of qudits may be representable by $D_j\cdot K_j$ positive $$\left\{\alpha_{k_j}^{(j)} U_{k_j}^{(j)\dagger} |x_j\rangle\langle x_j| U_{k_j}^{(j)}\right\}_{k_j=1, \ldots K_j, x_j=0, \ldots, D_j-1},$$

$K_j \geq D_j$, wherein $$\left\{\alpha_{k_j}^{(j)}\right\}_{k_j=1}^{K_j}$$

is a first probability distribution and $$\left\{U_{k_j}^{(j)}\right\}_{k_j=1}^{K_j}$$

is a set of local unitary operations on the qudits in the set $S_j$, said local positive operator-valued measure being parametrizable by operator parameters defining the probabilities $$\alpha_{k_j}^{(j)}$$

of the first probability distribution and the local unitary operations, and wherein implementing said local positive operator-valued measure for the set $S_j$ of qudits may comprise for each round s of the S rounds of measurement sampling a value $k_j \in [1, K_j]$ according to the first probability distribution $$\left\{\alpha_{k_j}^{(j)}\right\}_{k_j=1}^{K_j}$$

and applying the local unitary operation $$U_{k_j}^{(j)}$$

corresponding to the sampled value $k_j$ to the respective set $S_j$ of qudits followed by a projective measurement of said set $S_j$ of qudits onto its local basis $|x_j\rangle$ j=0, . . . , $D_j-1$ resulting in a measurement outcome $$x_j^{(s)} \in \{0, 1, \ldots, D_j-1\}$$

in the s-th round of measurement.

In one special example, the informationally complete local POVM associated to each subset $S_j$ of qudits may be representable by operators $$\left\{\alpha_{k_j}^{(j)} U_{k_j}^{(j)\dagger} |x_j\rangle\langle x_j| U_{k_j}^{(j)}\right\}_{k_j=1, \ldots K_j, x_j=0, \ldots, D_j-1}.$$

The respective first probability distributions and the respective sets of local unitary operations may be the same for all sets $S_j$ of qudits, or they may be different for at least two sets $S_j$ of qudits. In particular, they may be different for all sets of qudits.

The sampling of the value $k_j$ may be performed before the S rounds of measurement are carried out, or it may be performed during the S rounds of measurements. The sampling may be carried out, e. g., by using a classical computer.

For the set $S_j$ of qudits the application of the quantum circuit according to this embodiment indeed implements the POVM represented by the operators $$\left\{\alpha_{k_j}^{(j)} U_{k_j}^{(j)\dagger} |x_j\rangle\langle x_j| U_{k_j}^{(j)}\right\}_{k_j=1, \ldots K_j, x_j=0, \ldots, D_j-1},$$

as may be understood from the following:

For the s-th round of measurement a value $k_j \in [1, K_j]$ is sampled according to the probability distribution $$\left\{\alpha_{k_j}^{(j)}\right\}_{k_j=1}^{K_j},$$

and then the single-qubit unitary $$U_{k_j}^{(j)}$$

with the sampled index $k_j$ is applied to the set $S_j$ of qudits followed by a projective measurement of said set $S_j$ of qudits onto the its local basis $|x_j\rangle$, $x_j=0, \ldots, D_j-1$. I. e., a randomly sampled local unitary operation is applied to the set $S_j$ of qudits followed by a projective measurement onto the local basis states $$\{|x_j\rangle\langle x_j|\}_{x_j=0}^{D_j-1}$$

of the set $S_j$ of qudits. This is equivalent to a projective measurement with projectors $$\pi_{k_j,x_j} = U_{k_j}^{(j)\dagger} |x_j\rangle\langle x_j| U_{k_j}^{(j)}.$$

Due to the sampling, different local unitary operations may be applied in different rounds of measurement. S rounds of measurements result, for the set S of qudits, in the implementation of a local POVM described by the effects $$\left\{\alpha_{k_j}^{(j)} U_{k_j}^{(j)\dagger} |x_j\rangle\langle x_j| U_{k_j}^{(j)}\right\}_{k_j=1, \ldots K_j, x_j=0, \ldots, D_j-1}.$$

The probability to obtain the outcome $(k_j, x_j)$ is given by $$p_{k_j,x_j} = Tr\left[\alpha_{k_j}^{(j)} \pi_{k_j,x_j} \rho_j\right],$$

wherein $\rho_j$ is the reduced density operator of the state of the set $S_j$ of qudits. Since $K_j \geq D_j$, it may be ensured that the local POVM is informationally complete.

Each first probability distribution $$\left\{\alpha_{k_j}^{(j)}\right\}_{k_j=1}^{K_j}$$

may be parametrized by $K_j-1$ parameters $\phi_i \in [0, \pi/2]$ via $$\left\{\alpha_{k_j}^{(j)} = y_{k_j}^2\right\}_{k_j=1}^{K_j},$$

where $y_1=\cos(\phi_1)$, $y_2=\sin(\phi_1)\cos(\phi_2)$, . . . , $y_{k_j-1}=\sin(\phi_1)\sin(\phi_2) \ldots \sin(\phi_{K_j-2})\cos(\phi_{K_j-1})$, $y_{K_j}=\sin(\phi_1)\sin(\phi_2) \ldots \sin(\phi_{K_j-2})\sin(\#_{K_j-1})$, and each local unitary operation $$U_{k_j}^{(j)}$$

may be parametrized by real parameters. The operator parameters are updated in the adaptive measurement routine.

By using post-processing of the measurement outcomes $$x_j^{(s)}$$

obtained via the embodiment of the method explained above it is possible to implement further POVMs. In one embodiment, the informationally complete local positive operator-valued measure associated to at least one set S; of qudits may be representable by $$M_j \geq D_j^2$$

positive operators $$\prod_{m_j}^{(j)} = \sum_{k_j=1}^{K_j} \sum_{x_j=0}^{D_j-1} P^{(j)}(m_j|k_j, x_j)\alpha_{k_j}^{(j)} U_{k_j}^{(j)\dagger}|x_j\rangle\langle x_j|U_{k_j}^{(j)},$$

wherein $\{\{P^{(j)}(m_j|k_j,x_j)\}_{m_j=0, \ldots, M_j-1}\}_{k_j=1, \ldots, K_j; x_j=0, \ldots, D_j-1}$ is a set of $D_j \cdot K_j$ $M_j$-outcome conditional second probability distributions, said operator parameters further comprising parameters defining the probabilities $P^{(j)}(m_j|k_j,x_j)$, and implementing said positive operator-valued measure may comprise post-processing of the measurement outcome $x_j$, wherein said post-processing comprises sampling a value $m_j \in [0, M_j-1]$ according to the second probability distribution $P^{(j)}(m_j|k_j,x_j)$ with $k_j$ being the sampled index of the applied single-qubit unitary operation and relabeling the measurement outcome $x_j$ as $m_j$.

Thus, for the set $S_j$ of qudits, the local POVM representable by the effects $$\prod_{m_j}^{(j)} = \sum_{k_j=1}^{K_j} \sum_{x_j=0}^{D_j-1} P^{(j)}(m_j|k_j, x_j)\alpha_{k_j}^{(j)} U_{k_j}^{(j)\dagger}|x_j\rangle\langle x_j|U_{k_j}^{(j)}$$

is implemented as follows: For the s-th round of measurement, the qudit register is prepared in the initial qudit state. A value $k_j \in [1, K_j]$ is sampled according to the probability distribution $$\{\alpha_{k_j}^{(j)}\}_{k_j=1}^{K_j},$$

and the local unitary operation $$U_{k_j}^{(j)}$$

with the sampled value $k_j$ is applied to the set $S_j$ of qudits followed by a projective measurement of said set $S_j$ of qudits onto the local basis. This results in a measurement outcome $x_j$ for the respective set $S_j$ of qudits. This measurement outcome is thus obtained by using quantum computational means. Then, the measurement outcome is post-processed. The post-processing may be carried out with the help of a classical computer. To this end, a value $m_j \in [0, M_j-1]$ is sampled according to the second probability distribution $P^{(j)}(m_j|k_j,x_j)$, wherein $x_j$ is the respective measurement outcome and $k_j$ is the index of the applied local unitary operation. These informationally complete POVMs are disclosed, e. g., in "Simulating positive operator-valued measures with projective measurements" by M. Oszmaniec et al., Physical Review Letters, 119, 190501 (2017).

The operator parameters parametrizing this local POVM may be as follows: Each probability distribution $$\{\alpha_{k_j}^{(j)}\}_{k_j=1}^{K_j}$$

may be parametrized by $K_j-1$ parameters $\phi_i \in [0, \pi/2]$ as explained above, and each set of local unitary operations may be parametrized by a number R of real parameters. Furthermore, each second probability distribution $P^{(j)}(m_j|k_j, x_j)$ may be parametrized for fixed $k_j$, $x_j$ by $(M_j-1)$ angles $$\gamma_{k_j x_j}^{n_j} \in [0, \pi/2] \text{ via } \{P^{(j)}(m_j|k_j, x_j) = (z_{k_j,x_j}^{m_j})^2\}_{m_j=0}^{M_j-1},$$

$$\text{wherein } z_{k_j,x_j}^0 = \cos(\gamma_{k_j,x_j}^0),\ z_{k_j,x_j}^1 = \sin(\gamma_{k_j,x_j}^0)\cos(\gamma_{k_j,x_j}^1), \ldots ,$$

$$z_{k_j,x_j}^{M_j-2} = \sin(\gamma_{k_j,x_j}^0)\sin(\gamma_{k_j,x_j}^1) \ldots \sin(\gamma_{k_j,x_j}^{M_j-3})\cos(\gamma_{k_j,x_j}^{M_j-2}),$$

$$z_{k_j,x_j}^{M_j-1} = \sin(\gamma_{k_j,x_j}^0)\sin(\gamma_{k_j,x_j}^1) \ldots \sin(\gamma_{k_j,x_j}^{M_j-3})\sin(\gamma_{k_j,x_j}^{M_j-2}).$$

These local POVMs are generally non-projective POVMs. If one chooses $M_j=D_j$ one may be able to ensure that the local POVM is a minimal informationally complete POVM.

In one special example of said embodiment, the informationally complete local POVM associated to each set $S_j$ of qudits may be representable by $$M_j \geq D_j^2$$

positive operators $$\prod_{m_j}^{(j)} = \sum_{k_j=1}^{K_j} \sum_{x_j=0}^{D_j-1} P^{(j)}(m_j|k_j, x_j)\alpha_{k_j}^{(j)} U_{k_j}^{(j)\dagger}|x_j\rangle\langle x_j|U_{k_j}^{(j)}.$$

The respective first probability distributions, the respective second probability distributions and the respective sets of local unitary operations may be the same for all sets of qudits or they may be different for at least two set of qudits. In particular, they may be different for all sets of qudits.

In one possible embodiment of the third aspect of the present invention, implementing said positive operator-valued measures comprises, for at least one set of qudits $S_j$, sampling S values $$k_j^{(1)}, \ldots , k_j^{(S)} \in [1, K_j]$$

according to the first probability distribution $$\{\alpha_{k_j}^{(j)}\}_{k_j=1}^{K_j}$$

and defining a batch of S quantum circuits, wherein in s-th quantum circuit the local unitary operation $$U^{(j)}_{k_j^{(s)}}$$

with the sampled value $$k_j^{(S)}$$

may be applied to the set $S_j$ of qudits followed by a projective measurement of the qudits of said set $S_j$ of qudits onto the local basis of said set $S_j$ of qudits, and implementing said positive operator-valued measure may further comprise applying the s-th quantum circuit in the s-th round of measurement. Such an embodiment may be particularly useful when the qudit register is part of a quantum computing platform which is only remotely accessible. Then, the sampling of the values $k_j$ may be performed, e. g., on a classical computer. Furthermore, the batch of quantum circuits may be defined using a classical computer. The batch of quantum circuits may then be sent to the location of a quantum computer, where the quantum circuits are applied one by one to the initial qudit state.

The method according to the third aspect of the present invention comprises computational steps that may be carried out on a quantum computer by using a register of qudits and applying a quantum circuit to said qudit register. Furthermore, the method according to the third aspect of the present invention comprises further computational steps, like data processing of the measurement data, calculating a value of an estimator or post-processing as explained above. In one embodiment of the method according to the third aspect of the present invention, said post-processing and/or said data processing and/or said calculating of a value of the estimator may be carried out using a classical computing system. The classical computing system may comprise, but is not limited to, a central processing unit (CPU), a graphical processing unit (GPU), application-specific integrated circuits (ASICS) and a field-programmable gate array (FPGA). However, the method is not limited to this, and these computational steps may also be carried out by another means, e.g., by using a quantum computer.

In one embodiment of the method according to the third aspect of the present invention, said convergence rule may be fulfilled when the first value of the statistical error function is smaller than a third threshold value. The third threshold value may be determined in advance. Alternatively, the convergence rule may be fulfilled when the first value of the statistical error function is the same value to some accuracy for a given number of iterations.

The method of the third aspect of the present invention comprises calculating the value of an estimator of the observable quantity. In one embodiment, said data processing may comprise calculating the value of the estimator of the observable quantity. I.e., a value of the observable quantity may be calculated at each iteration of the adaptive measurement routine. Alternatively, the value of the estimator may only be calculated once the convergence rule is fulfilled.

In one embodiment of the method according to the third aspect of the present invention, an i-th iteration of said adaptive measurement routine may comprises defining an initial average value of the estimator $\overline{O}_{av,i}$ and an initial average value of the associated statistical error function $\overline{E}_{av,i}$, said initial average value of the estimator being the value $\overline{O}_i$ of the estimator and the initial average value of the statistical error function being the first value $\overline{E}_i$ of the statistical error function obtained in the i-th iteration of the adaptive measurement routine, and wherein for each iteration g>i, said measurement routine may comprise defining a new average value of the estimator $\overline{O}_{av,g}=(\overline{O}_g\overline{E}_{av,g-1}+\overline{O}_{av,g-1}\overline{E}_g)/(\overline{E}_g+\overline{E}_{av,g-1})$ and a new average value of the statistical error function $\overline{E}_{av,g}=\overline{E}_{av,g-1}\overline{E}_g/(\overline{E}_{av,g-1}+\overline{E}_g)$, wherein $\overline{O}_g$ is the value of the estimator and $\overline{E}_g$ is the value of the statistical error function calculated in the g-th iteration, and wherein the final estimated value of the observable quantity may be defined as the new average value of the estimator once the convergence rule is fulfilled. This embodiment of the method according to the third aspect of the present invention uses the intermediate values of the estimator and the statistical error function to calculate a weighted average such that the resulting statistical error is minimized. In this way, all measurement results obtained during the intermediate POVM optimization steps are used for the construction of the estimated value of the observable quantity. More details regarding this optimization are disclosed in arXiv:2104.00569v1, Chapter III C, the entire content of which is incorporated by reference.

In one embodiment of the method according to the third aspect of the present invention, said convergence rule may be fulfilled when the new average value of the statistical error function is smaller than a fourth threshold value.

The method according to the third aspect of the present invention requires calculating the value of an estimator of the observable quantity. In one embodiment of the method according to the third aspect of the present invention, said Hermitian operator associated to said observable O may be decomposable in terms of local operators on the sets of qudits, $$O=\sum_{i_1,\ldots,i_J} c_{i_1\ldots i_J} O^{(1)}_{i_1}\otimes\ldots\otimes O^{(J)}_{i_J},$$

with $$O^{(j)}_{i_j}$$

being a local operator acting on the qudits in the set S of qudits, said local operator being representable as $$O^{(j)}_{i_j}=\sum_{m_j=0}^{M_j-1} b^{(j)}_{i_j m_j}\prod^{(j)}_{m_j},$$

and wherein the estimator may be a function of $$\omega_{m_1\ldots m_J}=\sum_{i_1,\ldots,i_J} c_{i_1\ldots i_J} b^{(1)}_{i_1 m_1}\ldots b^{(J)}_{i_J m_J},$$

wherein $m_j$ is the measurement outcome of the implementation of the local positive operator-valued measure associated to the set $S_j$ of qudits, and in particular the estimator is of the form $$\bar{O} = \frac{1}{S}\sum_{s=1}^{S} \omega_{m_1^{(s)} \ldots m_N^{(s)}},$$

wherein $$m_j^{(s)}$$

is the outcome of the s-th round of measurement.

This estimator may be understood as follows: As the local POVMs associated to the qudits of the register are all informationally complete, it is always possible to represent the local operators $$O_{i_j}^{(j)}$$

acting on the set S; of qudits via the effects of the local POVM according to $$O_{i_j}^{(j)} = \sum_{m_j=0}^{M_j-1} b_{i_j m_j}^{(j)} \prod_{m_j}^{(j)}$$

with coefficients $$b_{i_j m_j}^{(j)}.$$

Thus, the expectation value of the operator O for the quantum state ρ may be rewritten as $$\langle O \rangle = Tr[\rho O] = \sum_{m_1, \ldots, m_J} \omega_{m_1 \ldots m_J} Tr\left[\rho \otimes_{j=1}^{J} \prod_{m_j}^{(j)}\right] = \sum_{m_1, \ldots, m_J} \omega_{m_1 \ldots m_J} p_{m_1 \ldots m_J}, \text{ wherein } p_{m_1 \ldots m_J}$$

is the probability to obtain the measurement outcome $(m_1, \ldots, m_J)$. Implementing the local POVMs via iteratively applying a quantum circuit to the initial qubit state corresponds to sampling from the probability distribution $\{p_{m_1 \ldots m_J}\}$ resulting in a sequence of outcomes $$\left(m_1^{(s)} \ldots m_J^{(s)}\right)$$

for the s-th round of measurement, and an estimator of the observable O is given by $$\bar{O} = \frac{1}{S}\sum_{s=1}^{S} \omega_{m_1^{(s)} \ldots m_N^{(s)}}.$$

Each term $$\omega_{m_1^{(s)} \ldots m_J^{(s)}}$$

is calculable in polynomial time in the number of local operators on a classical computer. In this way, the weighted average of all local operators is estimated simultaneously by exploiting the informationally complete data obtained from the application of the informationally complete POVM. In this way, state tomography which requires a number of measurements which is exponential in in the number of qudits and which requires storing data representing an exponentially large density matrix is prevented.

Given the estimator above, the statistical error function may be a function of the second moment of $\omega_{m_1 \ldots m_J}$ over the probability distribution $\{p_{m_1 \ldots m_J}\}$ to obtain the measurement outcome $(m_1, \ldots, m_J)$. For example, the statistical error function may be a function of the variance of $\omega_{m_1 \ldots m_J}$ over the probability distribution $\{p_{m_1 \ldots m_J}\}$. In one example, the statistical error function may be the variance of $\omega_{m_1 \ldots m_J}$ over the probability distribution $\{p_{m_1 \ldots m_J}\}$.

In one embodiment of the method according to the third aspect of the present invention, said statistical error function $\bar{E}$ is a function of the second moment of $\omega_{m_1 \ldots m_J}$ over the probability distribution $\{p_{m_1 \ldots m_J}\}$ to obtain the measurement outcome $(m_1, \ldots, m_J)$, and in particular $$\bar{E} = \frac{1}{S}\left[\frac{1}{S}\sum_{s=1}^{S} \omega_{m_1^{(s)} \ldots m_N^{(s)}} - \left(\frac{1}{S}\sum_{s=1}^{S} \omega_{m_1^{(s)} \ldots m_N^{(s)}}\right)^2\right].$$

In one embodiment of the method according to the third aspect of the present invention, said quantum many-body system is describable by a fermionic Hamiltonian of N modes, in particular by a Hamiltonian of the form $$H_F = \sum_{p,q=1}^{N} h_{pq} a_p^\dagger a_q + \frac{1}{2}\sum_{p,q,r,s=1}^{N} u_{pqrs} a_p^\dagger a_q^\dagger a_r a_s,$$

wherein $$a_p^\dagger$$

is a fermionic creation operator creating a fermionic particle in mode p, and $a_p$ is the corresponding fermionic annihilation operator. Such Hamiltonians are well known, e.g., in the field of condensed matter physics, solid state physics and quantum chemistry, and they are used to describe, among others, strongly interacting fermionic quantum many-body systems, like superconductors and Mott insulators as well as molecules. Furthermore, such Hamiltonians are of importance in the field of drug design and the modelling of proteins.

In one embodiment of the method according to the third aspect of the present invention, said quantum many-body system is a fermionic system and said encoding operation is the Jordan-Wigner transformation or the Bravyi-Kitaev mapping or the JKMN mapping or the Parity mapping.

The qudit register used in the method according to the third aspect of the present invention may be any qudit system which allows for state preparation, the application of local unitary operations on the sets S; of qudits and projective measurements. I. e., the method according to the third aspect of the present invention is implementable on different quantum computing platforms. In one embodiment, the qudits may be superconducting qudits. In this case, the method may be particularly useful, as quantum computation platforms with superconducting qudits may not allow the direct coupling of the qudits of the register with ancillary qudits. In other embodiments, the qudits may be ion qudits, or they may be photonic qudits. However, the invention is not limited to one of the qudits mentioned above.

According to a fourth and broader aspect of the invention, there is provided an apparatus for estimating a value of an observable quantity of a state of a quantum many-body system, said state being encodable as a qudit state of a register of N qudits via an encoding operation, the qudits being quantum mechanical d-level systems, said observable quantity being associated with a Hermitian operator O acting on the qudit register, wherein said apparatus comprises:

A register of N qudits, wherein the N qudits are divided into a partition of at least two sets $S_j$ of qudits, j=1, . . . , J, J≥2, wherein the j-th subset contains $N_j$≥1 qudits, wherein preferably each subset $S_j$ contains one qudit, i. e., J=N and $N_j$=1 for all j=1, . . . , J;

State preparation means for preparing the qudit register in an initial qudit state which is an encoding of said state of said quantum many-body system obtained via the encoding operation;

Means for applying a quantum circuit to said qudit register, wherein said quantum circuit is representable as a quantum circuit which comprises only local unitary operations acting locally on the individual subsets $S_j$ of qudits, $U=U_1\otimes \ldots \otimes U_J$, wherein $U_j$ acts on the subset $S_j$ of qudits, and projective measurements of the qudits onto a local basis of each of the subsets $Q_j$ of qudits, the local basis for the subset $S_j$ being described by state vectors $|x_j\rangle$, $x_j$=0, . . . , $D_j$−1;

Data processing means;

Control means, said control means being operative to iterate an adaptive measurement routine for optimizing positive operators with respect to a statistical error function, wherein said positive operators are defined by associating to each subset of $S_j$ of qudits, j=1, . . . , J, an initial informationally complete local positive operator-valued measure representable by $$M_j \geq D_j^2$$

positive operators $$\prod\nolimits_{m_j}^{(j)}, m_j = 0, \ldots , M_j - 1$$

with respective measurement outcome $m_j$, wherein $D_j$ is the dimension of the Hilbert space associated to the subset $S_j$ of qudits, the positive operators being parametrizable by an initial set of operator parameters, and the statistical error function is given by defining an estimator for said observable quantity and an associated statistical error function of said estimator as a function of said operator parameters and the possible measurement outcomes of the local positive operator-valued measures;

wherein said adaptive measurement routine accepts said operator parameters as an input and comprises:

Implementing said positive operator-valued measures parametrized by the operator parameters received as an input on said qudit register to obtain a set of measurement data as an output, wherein implementing said positive operator-valued measures comprises for each round s of a given number S of rounds of measurements preparing the qudit register in an initial qudit state which is an encoding of said state of said quantum many-body system obtained via the encoding operation by using the state preparation means and applying a quantum circuit to said qudit state using said means for applying a quantum circuit, said quantum circuit being representable as a quantum circuit which comprises only local unitary operations acting locally on the individual subsets $S_j$ of qudits, $U=U_1\otimes \ldots \otimes U_J$, wherein $U_j$ acts on the subset $S_j$ of qudits and is determined by the operator parameters, and projective measurements of the qudits onto the local basis $|x_j\rangle$, $x_j$=0, . . . , $D_j$−1 of each subset $S_j$ of qudits;

Data processing said measurement data using said data processing means, wherein said data processing comprises calculating a first value of the statistical error function given said operator parameters and said measurement data and determining new operator parameters parametrizing an informationally complete local positive operator-valued measure for each set S; of qudits as an input for the next iteration of the measurement routine, wherein said new operator parameters result in a smaller second value of the statistical error function given said measurement data than the first value, wherein said iteration is repeated until a convergence rule is fulfilled;

Means for calculating a value of the estimator of the observable quantity given the measurement data and the operator parameters as an estimation of the value of the observable using the data processing means.

The apparatus according to the fourth aspect of the present invention is thus adapted to carry out the method according to the third aspect of the present invention. Everything that was said above in relation to the method also applies to the apparatus. In particular, for the case that the qudits are qubits, each subset S; contains exactly one qubit, the apparatus according to the fourth aspect of the present invention is the apparatus according to the second aspect of the present invention and is thus adapted to carry out the method according to the first aspect of the present invention.

The means for calculating a value of the estimator may be or may comprise the data processing means, or the data processing means may comprise the means for calculating a value of the estimator. The means for calculating a value of the estimator and/or the data processing means may be a classical computing system. Thus, the apparatus according to the fourth aspect of the present invention may comprise a hybrid of a classical computing system and a quantum computer.

Figure 2:
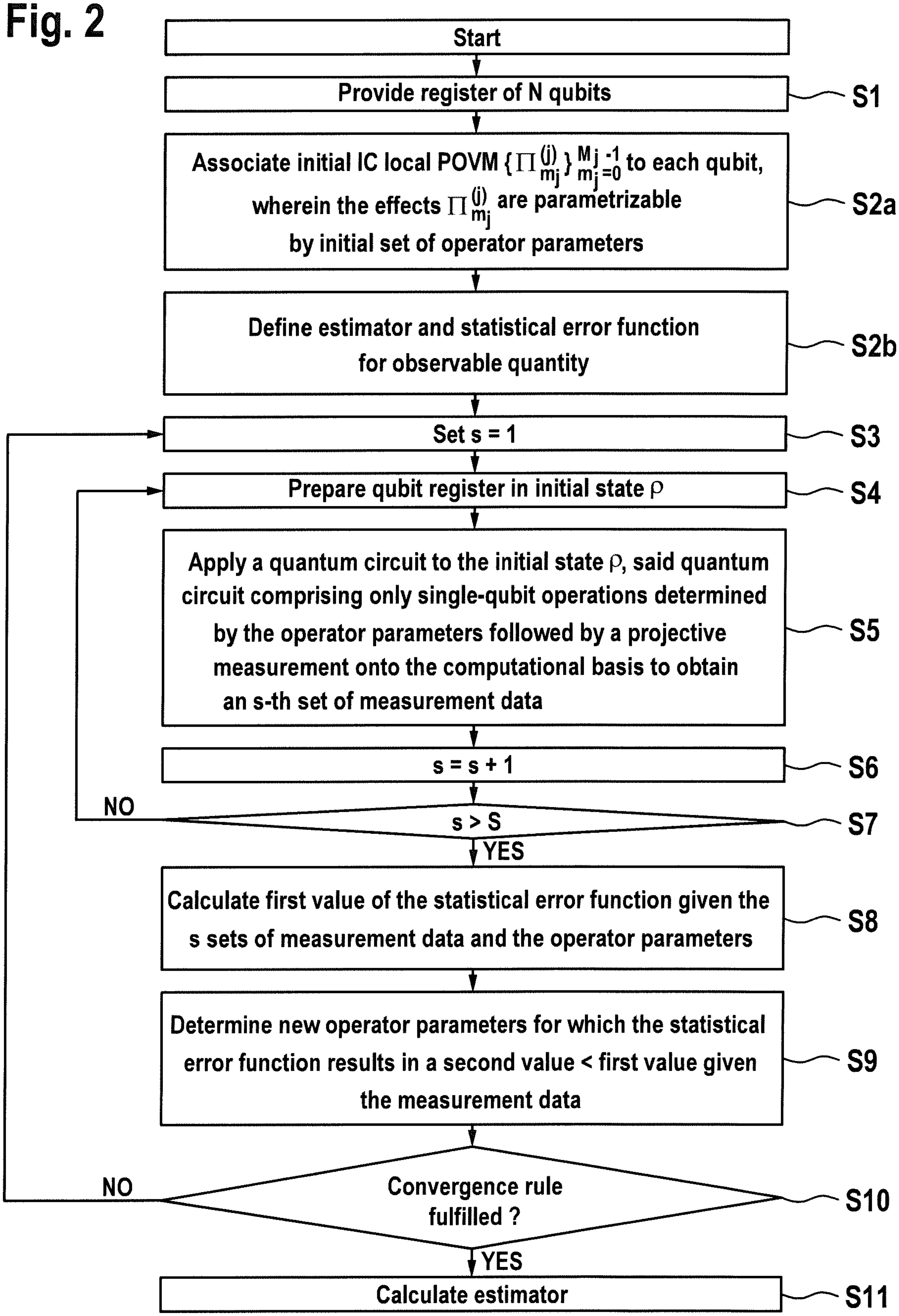
Figure 3:
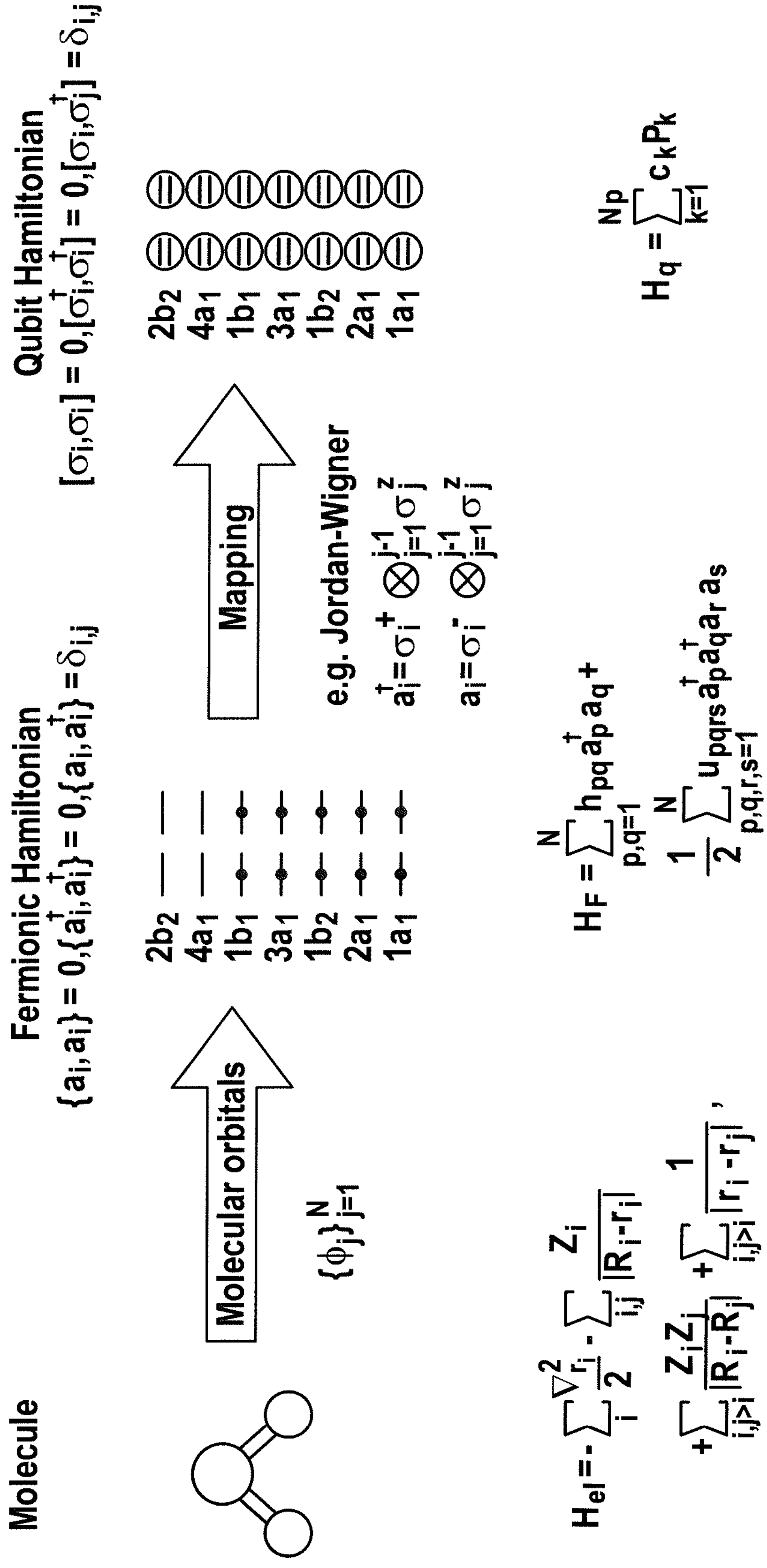
Figure 4:
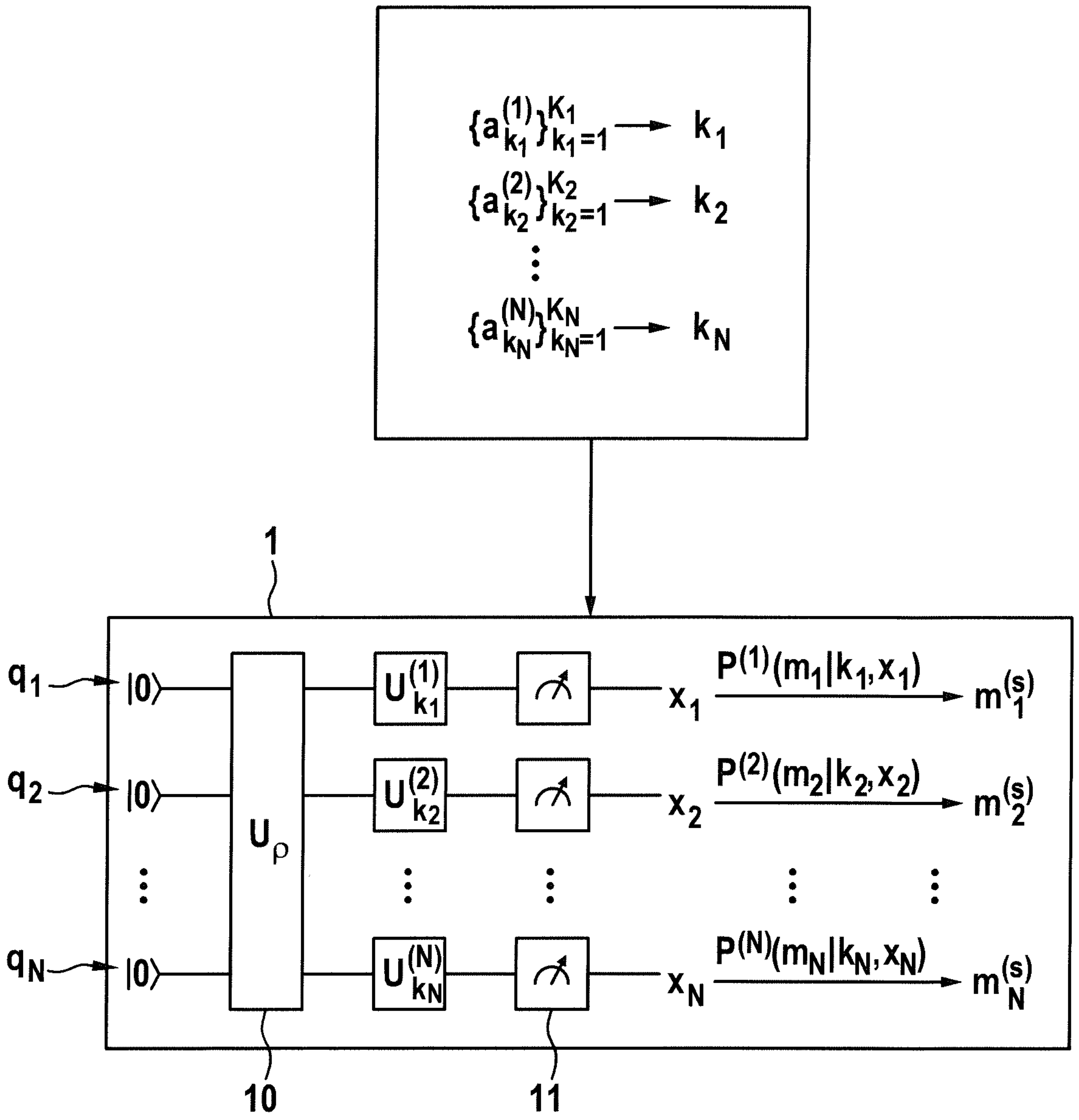
Figure 5:
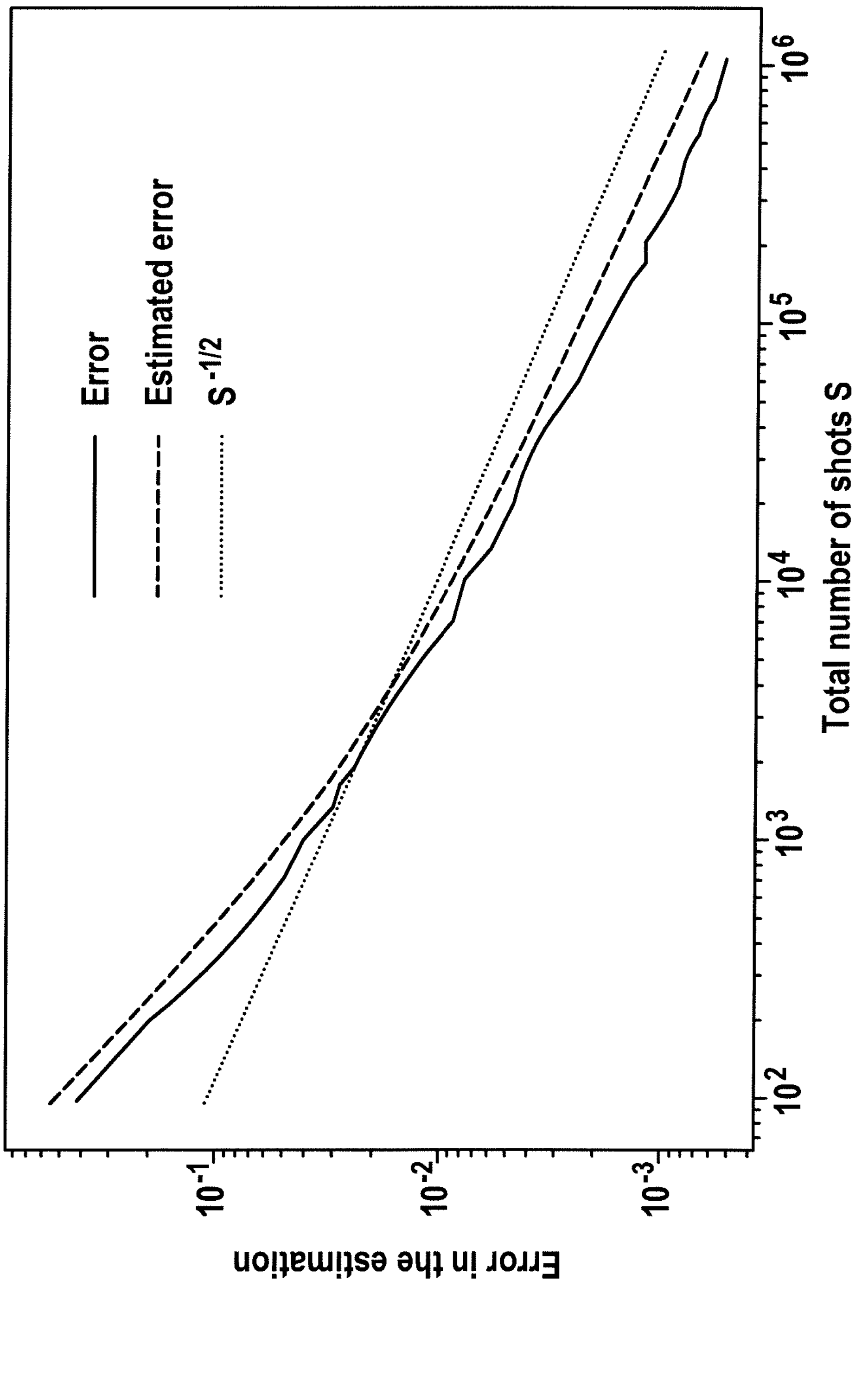

In the following description, the invention will be specified in greater detail by way of examples, with reference to the drawings. In the drawings, FIG. 1 depicts a schematic exemplary embodiment of the apparatus according to the second aspect of the present invention which is adapted to carry out the method according to the first aspect of the present invention, FIG. 1*a* depicts a schematic representation of a qubit, FIG. 2 depicts a flow diagram of an example of the method according to the first aspect of the present invention, FIG. 3 depicts a graphical representation of a mapping from the electronic Hamiltonian of a molecule to a qubit Hamiltonian, FIG. 4 depicts a schematic representation of the adaptive measurement routine according to an embodiment of the first aspect of the present invention, FIG. 5 depicts numerical results for the estimation of the energy of a $H_2$ molecule according to the method of the present invention.

Figure 1A:
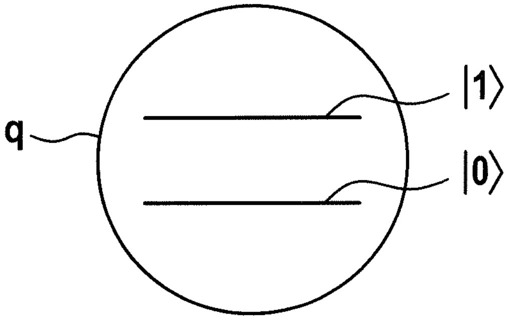

FIG. 1. depicts a schematic exemplary embodiment of the apparatus 100 according to the second aspect of the present invention which is adapted to carry out the method according to the first aspect of the present invention. The apparatus 100 comprises a register 1 of N qubits $q_1$, $q_2$, $q_3$, $q_4$, $q_5$. In the example shown in FIG. 1, the register 1 comprises five qubits, $q_1$, $q_2$, $q_3$, $q_4$, $q_5$, but the apparatus according to the present invention is not limited to this, and there may be more or less than five qubits in the qubit register 1. The qubit register 1 may be realized by a quantum system of cold atoms, ions, photons or superconducting circuits, but is not limited to one of these realizations. Each qubit is a quantum mechanical two-level system describable by a local basis with state vectors $|0\rangle$ and $|1\rangle$. The state vector $|0\rangle$ may be associated to the ground state of the two-level system and the state vector $|1\rangle$ may be associated to an excited state of the two-level system (see FIG. 1*a*)

The apparatus 100 comprises state preparation means 2. The state preparation means 2 are adapted to prepare the qubits 1*a*, 1*b*, 1*c*, 1*d*, 1*e* of the qubit register 1 in an initial qubit state ρ.

Furthermore, the apparatus 100 comprises means 3 for applying a quantum circuit to said qubit register 1. The quantum circuit to be applied comprises only single-qubit operations and projective measurements of the qubits onto the computational basis. Thus, the means 3 comprises means for applying single-qubit operations $U_j$ 3*a*, 3*b*, 3*c*, 3*d*, 3*e* to each of the qubits $q_1$, $q_2$, $q_3$, $q_4$, $q_5$ and measurement means 3A, 3B, 3C, 3D, 3E for carrying out a projective measurement of each of the qubits onto the corresponding computational basis $|0\rangle$ and $|1\rangle$. I.e., the measurement means 3A, 3B, 3C, 3D, 3E is adapted to carry out a projective measurement onto the computational basis of each qubit given by local projectors $|0\rangle\langle 0|$ and $|1\rangle\langle 1|$. In this way, measurement data may be obtained.

The apparatus further comprises data processing means 4. The data processing means 4 is adapted to carry out several data processing operations that will be described in more detail below. In particular, the data processing means 4 may be in communication with the means 3 and receive the measurement data obtained by applying the quantum circuit to the initial qubit state as an input.

The apparatus 100 further comprises control means 5. The control means 5 may be in communication with the state preparation means 2, the means 3 for applying the quantum circuit and the data processing means 4. The control means 5 is operative to control the state preparation means 2, the means 3 for applying the quantum circuit and the data processing means 4 to carry out the method according to the first aspect of the present invention as will be described in more detail below. The control means 5 may comprise electronic data processing means.

FIG. 2 depicts a flow diagram of the method according to the first aspect of the present invention. The method is adapted to estimate a value of an observable quantity of a state of a quantum many-body system. The quantum many-body system and the respective state are not limited as long as said state is encodable as a qubit state of a register of N qubits via an encoding operation.

One possible application of said method is within the field of quantum chemistry. An overview of the current status of quantum hardware and algorithm theory in this field is presented in "How will quantum computers provide an industrially relevant computational advantage in quantum chemistry?" by V. E. Elfving et. al., arXiv:2009.12472.

In some industrially relevant applications of quantum chemistry one is interested in the properties of a molecule, e.g. its ground state energy, as a function of the positions of the nuclei, which may be modelled as point-like charges fixed in space within the so-called Born-Oppenheimer approximation. The electronic Hamiltonian in the first quantization is given by $$H_{el} = -\sum_i \frac{\nabla_{r_i}^2}{2} - \sum_{i,j} \frac{Z_i}{|R_i - r_j|} + \sum_{i,j>i} \frac{Z_i Z_j}{|R_i - R_j|} + \sum_{i,j>i} \frac{1}{|r_i - r_j|}.$$

Here, $R_i$ and $Z_i$ are the coordinates and charges of the nuclei in the molecule, and $r_i$ are the coordinates of the electrons. This Hamiltonian assumes an infinite-dimensional Hilbert space. Typically, a second quantization picture is used, where a basis of the single-electron Hilbert space is defined in terms of a set of single-electron wave functions $\{\phi_q(x)\}$ where x accounts for the position and spin degree of freedom. The Hamiltonian then becomes $$H_f = \sum_{p,q} h_{pq} a_p^\dagger a_q + \frac{1}{2} \sum_{p,q,r,s} u_{pqrs} a_p^\dagger a_q^\dagger a_r a_s a_s \tag{2}$$

where $$a_q^\dagger(a_q)$$

is the fermionic creation (annihilation) operator of the state $\phi_q(x)$, and the coefficients $h_{pq}$ and $u_{pqrs}$ are given by $$h_{pq} = \int dx \phi_p^*(x) \left( \frac{\nabla_r^2}{2} - \sum_{i,j} \frac{Z_i}{|R_i - r_j|} \right) \phi_q(x)$$

$$u_{pqrs} = \int dx_1 dx_2 \frac{\phi_p^*(x_1)\phi_q^*(x_2)\phi_s(x_1)\phi_r(x_2)}{|r_1 - r_2|}$$

The basis set is truncated to a finite number $N_O$ of wave functions, called spin-orbitals, $$\{\phi_q(x)\}_{q=1}^{N_o}$$

in order to make the calculation feasible. In general, the larger the number of spin orbitals the more accurate the prediction.

The second-quantized finite-dimensional description of the problem may be mapped to a system of $N=N_O$ qubits via so-called fermion-to-qubit mappings which allow an encoding of a state of a quantum many-body system governed by a fermionic Hamiltonian (e.g. its ground state or one of its excited states) in a system of N qubits. One example of such a mapping is the Jordan-Wigner transformation (JWT). There, the fermionic mode operators are ordered, and the mapping $$a_i^\dagger = \sigma_i^+ \otimes_{j=1}^{i-1} \sigma_j^z$$

is applied, wherein the ladder operator $$\sigma_j^+$$

acting on the qubit $q_j$ is defined by $$\sigma_1^+ = (\sigma_j^x - i\sigma_j^y)/2.$$

In the JWT, each spin-orbital is mapped to one specific qubit, where the state of the qubit directly represents the occupation of said orbital. By applying this mapping, every product of fermionic operators is mapped to a linear combination of Pauli strings, i.e., operators of the form $$P_k = \bigotimes_{i=1}^N \sigma_{k_i}^{(i)}.$$

For the example given above, another mapping may prove more useful. This mapping is presented in Z. Ziang, A. Kalev, W. Mruczkiewicz and H. Neven "Optimal fermion-to-qubit mapping via ternary trees with applications to reduced quantum state learning", Quantum 4, 276 (2020), the entire content of which is incorporated herein by reference. This mapping, which is also abbreviated as JKMN mapping, may be applied to the state of a quantum many-body system governed by the Hamiltonian above as well. In FIG. 3, the mapping from the electronic Hamiltonian to the qubit Hamiltonian is graphically represented for the case of the Jordan Wigner transformation as an example.

The observable quantity is associated with a Hermitian operator O acting on the qubit register. It is always possible to express this observable in terms of Pauli strings, $$O = \sum_{i_1, \ldots, i_N=0}^{3} c_{i_1 \ldots i_N} \sigma_{i_1}^{(1)} \otimes \ldots \otimes \sigma_{i_N}^{(N)},$$

with $$\sigma_{i_j}^{(j)}$$

being a Pauli operator acting on the qubit $q_j$. For example, the observable quantity may be the energy of the state of the quantum system, and the associated Hermitian operator is then the Hamiltonian of the quantum system.

The method comprises providing a register of N qubits (step S1). The method further comprises (step S2*a*) associating to each qubit $q_j$, j=1, . . . , N, an initial informationally complete local positive operator-valued measure (POVM) representable by $M_j \geq 4$ positive operators $$\prod_{m_j}^{(j)},$$

$m_j=0, \ldots, M_j-1$ with respective measurement outcome $m_j$, the operators being parametrizable by an initial set of operator parameters. Possible parametrizations of the local POVMs were given above. The positive operators are also called effects. As the local POVMs are informationally complete, the Pauli operator acting on qubit $q_j$ may be expressed in terms of the effects as $$\sigma_{i_j}^{(j)} = \sum_{m_j=0}^{M_j-1} b_{i_j m_j}^{(j)} \prod_{m_j}^{(j)}$$

with real parameters $$b_{i_j m_j}^{(j)}.$$

In step S2*b* of the method, an estimator for said observable quantity and an associated statistical error function of said estimator are defined as a function of said operator parameters and the possible measurement outcomes of the local positive operator-valued measures. The steps S2*a* and S2*b* may be interchanged. The estimator may be a function of $$\omega_{m_1 \ldots m_N} = \sum_{i_1, \ldots, i_N=0}^{3} c_{i_1 \ldots i_N} b_{i_1 m_1}^{(1)} \ldots b_{i_N m_N}^{(N)}.$$

In particular, the estimator may be of the form $$\bar{O} = \frac{1}{S} \sum_{s=1}^{S} \omega_{m_1^{(s)} \ldots m_N^{(s)}},$$

wherein $$(m_1^{(1)} \ldots m_N^{(s)})$$

is the outcome of the s-iteration of the implementation of the positive operator-valued measures. The statistical error function may be a function of the second moment of $\omega_{m_1 \ldots m_N}$ over the probability distribution $\{p_{m_1 \ldots m_N}\}$ to obtain the measurement outcome $(m_1, \ldots, m_N)$. For example, the statistical error function may be proportional to the variance of $\omega_{m_1 \ldots m_N}$ over the probability distribution $\{p_{m_1 \ldots m_N}\}$ to obtain the measurement outcome $(m_1, \ldots, m_N)$. For example, the statistical error function may be said variance, $$\text{i.e. } \bar{E} = \frac{1}{S} \sum_{s=1}^{S} \omega^2_{m_1^{(s)} \ldots m_N^{(s)}} - \left(\frac{1}{S} \sum_{s=1}^{S} \omega_{m_1^{(s)} \ldots m_N^{(s)}}\right)^2.$$

At S3 a counter s for the S rounds of measurements is set to 1, s=1. At S4, the qubit register is prepared in an initial qubit state ρ which is an encoding of said state of said quantum many-body system obtained via the encoding operation. The initial qubit state may be, e.g an encoding of the ground state of the Hamiltonian given in Equation (2). The initial qubit state may be prepared via techniques known in the art.

At S5, a quantum circuit is applied to said qubit state, said quantum circuit being representable as a quantum circuit which comprises only single-qubit operations determined by the operator parameters and projective measurements of the qubits onto the computational basis. In this way, the application of the local POVMs to the initial qubit state is implemented, and an s-th set of measurement data $$(m_1^{(s)} \ldots m_N^{(s)})$$

is obtained. Details of a possible quantum circuit will be explained in more detail below.

At S6, the counter s is increased by 1, s=s+1. Then, at S7 it is verified whether s>S, wherein S is the predetermined number of rounds of measurements. If the answer is NO, the method returns to S4. If the answer is YES, i.e., the quantum circuit has been applied for the desired number S of rounds of measurements to the qubit state ρ, the method proceeds to S8.

At S8, a first value of the statistical error function is calculated given the S sets of measurement data. Next, at S9, new operators are determined for which the statistical error function results in a second value given the measurement data, said second value being smaller than the first value. Details on how these new operator parameters may be determined will be given below. Then, at S10, it is verified whether a convergence rule is fulfilled. If the answer is NO, the method returns to S3. If the answer is YES, a value of the estimator is calculated at S11, and the method stops.

In the method according to the present invention it may also be possible to carry out step S10 (verifying whether a convergence rule is fulfilled) directly after step S8 (calculating the first value), and to determine the new operator parameters (step S9) only when the convergence rule is not fulfilled, and return then to step S3.

In the following, a special example of estimating a value of an observable quantity using a special set of Informationally complete POVMs will be explained.

1. The Problem

Given is a state of a quantum many-body system. For illustrative purposes, said state is the ground state of a molecular Hamiltonian given in first quantization by $$H_{el} = -\sum_i \frac{\nabla^2_{r_i}}{2} - \sum_{i,j} \frac{Z_i}{|R_i - r_j|} + \sum_{i,j>i} \frac{Z_i Z_j}{|R_i - R_j|} + \sum_{i,j>i} \frac{1}{|r_i - r_j|}$$

It is the goal to estimate the value of an observable quantity. Said observable quantity is associated to a Hermitian operator O. This problem will be solved with the help of a quantum computing platform and classical computational means. The classical computational means may comprise a classical computer.

2. Encoding Operation

As was described in detail above, the first quantization Hamiltonian may be mapped to a second quantization Hamiltonian in which only N spin-orbitals are taken into account. This Hamiltonian is of the following form:

$$H_f = \sum_{p,q} h_{pq} a_p^\dagger a_q + \frac{1}{2} \sum_{p,q,r,s} u_{pqrs} a_p^\dagger a_q^\dagger a_r a_s a_s$$

The ground state of this Hamiltonian may be represented as $$|\Psi\rangle = \sum_{n_1, \ldots n_N = 0}^{1} \psi_{n_1 \ldots n_N} \left(a_1^\dagger\right)^{n_1} \ldots \left(c_N^\dagger\right)^{n_N} |0\rangle$$

with complex coefficients $\psi_{n_1 \ldots n_N}$. This ground state may be mapped to a qubit state ρ, e.g., by a Jordan-Wigner transformation or any other fermion-to-qubit mapping, e. g. the JKMN mapping. Similarly, the Hermitian operator O associated to the observable quantity may be mapped to a qubit basis. The general form of this operator is then given by $$O = \sum_k c_k P_k = \sum_{k_1, \ldots, k_N = 0}^{3} c_{k_1 \ldots k_N} \sigma_{k_1}^{(1)} \otimes \ldots \otimes \sigma_{k_N}^{(N)}, \text{ with } \sigma_{k_j}^{(j)}$$

being a Pauli operator acting on the qubit $q_j$. The observable quantity may be the ground state energy, and the associated Hermitian operator is then the Hamiltonian given above.

3. Parametrization of the Local POVMs

The method comprises associating, to each qubit $q_j$, a local informationally complete (IC) POVM. In the specific example, the local IC POVM associated to the qubit $q_j$ is representable by the effects $$\left\{\prod_{m_j}^{(j)} = \sum_{k_j=1}^{K_j} \sum_{x_j=0}^{1} P^{(j)}(m_j | k_j, x_j) \alpha_{k_j}^{(j)} U_{k_j}^{(j)\dagger} |x_j\rangle\langle x_j| U_{kj}^{(j)}\right\}_{m_j=0}^{M_j-1},$$

wherein $$\left\{\alpha_{k_j}^{(j)}\right\}_{k_j=1}^{K_j}$$

is a first probability distribution, $$\left\{U_{k_j}^{(j)}\right\}_{k_j=1}^{K_j}$$

is a set of single-qubit unitary operations, $K_j \geq 3$, and $\{\{P^{(j)}(m_j|k_j,x_j)\}_{m_j=0, \ldots, M_j-1}\}_{k_j=1, \ldots, K_j; x_j=0,1}$ is a set of $2K_j$ $M_j$-outcome conditional second probability distributions with $M_j \geq 4$. Possible parametrizations of the first and second probability distributions and the single-qubit unitary operations were given above.

4. Definition of the Estimator and the Statistical Error Function

The general form of the Hermitian operator associated with the observable O is given by $$0 = \sum_k c_k P_k = \sum_{k_1, \ldots, k_N = 0}^{3} c_{k_1 \ldots k_N} \sigma_{k_1}^{(1)} \otimes \ldots \otimes \sigma_{k_N}^{(j)},$$

with $$\sigma_{k_j}^{(j)}$$

being a Pauli operator acting on the qubit $q_j$. As the local POVMs associated to the qubits of the register are all informationally complete, it is always possible to represent the Pauli operators $$\sigma_{i_j}^{(j)}$$

acting on the qubit $q_i$ via the effects of the local POVM $$\sigma_{i_j}^{(j)}=\sum_{m_j=0}^{M_j-1} b_{i_j m_j}^{(j)} \prod_{m_j}^{(j)}$$

with real coefficients $$b_{i_j m_j}^{(j)}.$$

Thus, the expectation value of the operator O for the quantum state ρ may be rewritten as $$\langle O\rangle = Tr[\rho O] = \sum_{m_1,\ldots,m_N} \omega_{m_1 \ldots m_N} Tr\left[\rho \otimes_{j=1}^{N} \prod_{m_j}^{(j)}\right] = \sum_{m_1,\ldots,m_N} \omega_{m_1 \ldots m_N} p_{m_1 \ldots m_N},$$

wherein $p_{m_1 \ldots m_N}$ is the probability to obtain the measurement outcome $(m_1, \ldots, m_N)$ and $$\omega_{m_1 \ldots m_N} = \sum_{k_1,\ldots,k_N} c_{k_1 \ldots k_N} \prod_{i=1}^{N} b_{k_i m_i}^{(i)}.$$

Implementing the local POVMs via iteratively applying a quantum circuit to the initial qubit state corresponds to sampling from the probability distribution $\{p_{m_1 \ldots m_N}\}$ resulting in a sequence of outcomes $$\left(m_1^{(s)} \ldots m_N^{(s)}\right)$$

for the s-th round of measurement, and an estimator of the observable O is given by $$\overline{O}=\frac{1}{S}\sum_{s=1}^{S} \omega_{m_1^{(s)} \ldots m_N^{(s)}}.$$

This estimator depends on the measurement data and the local POVMs.

The estimator $\overline{O}$ defined above converges to the expectation value $\langle O\rangle$ as $$\sqrt{\operatorname{Var}\left(\omega_{m_1^{(s)} \ldots m_N^{(s)}}\right)/S},$$

where $$\operatorname{Var}\left(\omega_{m_1^{(s)} \ldots m_N^{(s)}}\right)$$

is the variance of $$\omega_{m_1^{(s)} \ldots m_N^{(s)}}$$

over the probability distribution $\{p_{m_1 \ldots m_N}\}$. Thus, the statistical error function may be the variance, $$\operatorname{Var}\left(\omega_{m_1^{(s)} \ldots m_N^{(s)}}\right) \text{ i.e, } \overline{E}=\frac{1}{S}\sum_{s=1}^{S} \omega_{m_1^{(s)} \ldots m_N^{(s)}}^2-\left(\frac{1}{S}\sum_{s=1}^{S} \omega_{m_1^{(s)} \ldots m_N^{(s)}}\right)^2.$$

5. Adaptive Measurement Routine

Next, the adaptive measurement routine is explained in detail with reference to FIG. 4. The adaptive measurement routine is a hybrid quantum-classical method that aims at optimizing the local POVMs used for measuring the observable quantity by minimizing the statistical error function of the estimator.

To this end, the following measurement routine is carried out S times on a qubit register 1 shown in FIG. 4. Initially, all qubits $q_1, \ldots, q_N$ are in the state represented by the state vector $|0\rangle$, though the method it not limited to this. Then, the qubit register is prepared in the initial qubit state ρ which is an encoding of the ground state of $H_f$ (see point 2 above) in the qubit basis, as has been explained in detail under point 2 above. The present method is not limited to a special way of preparing that ground state. In one non-limiting example, a quantum circuit 10 for preparing said initial qubit state may be applied to the qubit register, said quantum circuit being represented by a unitary operator $U_\rho$.

Once the initial qubit state is prepared, the local POVMs are implemented on the initial qubit state. To this end, a quantum circuit comprising only single-qubit unitary operations $$U_{k_1}^{(1)}, \ldots, U_{k_N}^{(N)}$$

and projective measurements 11 onto the computational basis is applied to the initial qubit state. The single-qubit unitary operations depend on operator parameters of the local POVMs associated to each of the qubits in the following way:

For each qubit $q_j$, a value $k_j \in [1, K_j]$ is randomly sampled according to the associated probability distribution $$\left\{\alpha_{k_j}^{(j)}\right\}_{k_j=1}^{K_j}.$$

This sampling may be performed using a classical computer. The sampling may be carried out before or after the initial state preparation. Then, the respective single-qubit unitary operation $$U_{k_j}^{(j)}$$

being chosen from the associated set of single-qubit unitary operations parametrized by the respective operator parameters and having the sampled value $k_j$ as an index is applied to the respective qubit $q_j$. Afterwards, a projective measurement onto the computational basis is applied to each qubit. This leads for each qubit $q_j$ to a measurement outcome $x_k=0$ or $x_k=1$. This quantum circuit is equivalent to a projective measurement with projectors $$\pi_{k_j,0}=U_{k_j}^{(j)\dagger}|0\rangle\langle 0|U_{k_j}^{(j)}$$

and $$\pi_{k_j,1} = U_{k_j}^{(j)\dagger}|1\rangle\langle 1|U_{k_j}^{(j)}.$$

I.e., the s-th application of the quantum circuit corresponds, for the qubit $q_j$, to a measurement with $2K_j$ possible outcomes described by the effects $$\left\{\alpha_{k_j}^{(j)}\pi_{k_j,x_j}\right\}_{k_j=1,\ldots K_j,x_j=0,1}.$$

The probability to obtain the outcome $(k_j, x_j)$ is given by $$p_{k_j,x_j} = Tr\left[\alpha_{k_j}^{(j)}\pi_{k_j,x_j}\rho_j\right],$$

wherein $\rho_j$ is the reduced density operator of the state of the qubit $q_j$.

The measurement outcomes are then post-processed. The post-processing may be carried out once all S rounds of measurements are completed. Alternatively, it may be carried out after each application of the quantum circuit. The post-processing may be carried out using a classical computer. For the post-processing, a value $m_j \in [0, M_j-1]$ is randomly sampled according to the second probability distribution associated to the respective qubit $q_j$, $P^{(j)}(m_j|k_j,x_j)$ for each outcome $(k_j,x_j)$, and then the measurement outcome $x_j$ is relabeled by $m_j$. Thus, the s-th application of the quantum circuit leads to a set of measurement outcomes $$(m_1^{(s)}, \ldots, m_N^{(s)}).$$

In total, the cumulative result of applying the quantum circuit S times realizes, for each qubit $q_j$, the local POVM described by the effects $$\prod_{m_j}^{(j)} = \sum_{k_j=1}^{K_j}\sum_{x_j=0}^{1} P^{(j)}(m_j|k_j, x_j)\alpha_{k_j}^{(j)}U_{k_j}^{(j)\dagger}|x_j\rangle\langle x_j|U_{k_j}^{(j)}.$$

If one chooses $M_j=4$ one may be able to ensure that the local POVM is a minimal informationally complete POVM.

Once the S sets of measurement data $$\{(m_1^{(s)}, \ldots, m_N^{(s)})\}_{s=1}^{S}$$

is obtained, a first value of the statistical error function is calculated. This calculation may be performed on a classical computer. To this end, the quantity $$\omega_{m_1^{(s)}\ldots m_N^{(s)}} = \sum_{k_1,\ldots,k_N} c_{k_1\ldots k_N}\prod_{i=1}^{N} b_{k_i m_i^{(s)}}^{(i)}$$

is calculated for each of the s sets of measurement data, wherein the coefficients $$b_{k_i m_i}^{(i)}$$

depend on the operator parameters of the local POVMs. Then, the statistical error function $$\overline{E} = \frac{1}{S}\sum_{s=1}^{S}\omega_{m_1^{(s)}\ldots m_N^{(s)}}^2 - \left(\frac{1}{S}\sum_{s=1}^{S}\omega_{m_1^{(s)}\ldots m_N^{(s)}}\right)^2$$

is calculated, resulting in a first value $\overline{E}_1=\overline{E}$.

As the local POVMs are informationally complete, it is possible to make a prediction about the statistical error of other POVMs that were not implemented. To this end, one may define a new local informationally complete POVM for the qubit $q_i$ determined by the effects $$\Gamma_r^{(i)}.$$

As the local POVMs are informationally complete, one may express the new effects in terms of the old effects via $$\Gamma_r^{(i)} = \sum_m d_{rm}^{(i)}\prod_m^{(i)}$$

with real coefficients $$d_{rm}^{(i)}.$$

Further, the local Pauli operators may be equally expressed in terms of these effects via $$\sigma_{i_j}^{(j)} = \sum_{m_j=0}^{M_j-1}\tilde{b}_{i_j m_j}^{(j)}\Gamma_{m_j}^{(j)}$$

with real coefficients $$\tilde{b}_{i_j m_j}^{(j)}$$

and the Hermitian operator O may be expressed as $$O = \sum_{r_1\ldots r_N}\tilde{\omega}_{r_1\ldots r_N}\otimes_{j=1}^{N}\Gamma_{r_j}^{(j)},$$

wherein $$\tilde{\omega}_{r_1\ldots r_N} = \sum_{k_1,\ldots,k_N} c_{k_1\ldots k_N}\prod_{i=1}^{N}\tilde{b}_{k_i r_i}^{(i)}.$$

The second value of the statistical error function may then be expressed in terms of the obtained measurement data as $$\overline{E}_2 = \frac{1}{S}\sum_{s=1}^{S}\sum_{r_1,\ldots,r_N}\tilde{\omega}_{r_1,\ldots,r_N}^2\prod_{j=1}^{N} d_{r_j m_j^{(s)}}^{(j)} - \left(\frac{1}{S}\sum_{s=1}^{S}\omega_{m_1^{(s)}\ldots m_N^{(s)}}\right)^2.$$

In this way, one may approximate the gradient of the statistical error function and use a gradient optimization algorithm to obtain a new set of local POVMs which leads to a smaller variance than the local POVMs that are used to obtain the measurement data. For example, one may change only one of the local POVMs, e.g., the POVM associated to the qubit $q_j$. Then, $$d_{rm}^{(i)} = \delta_{rm} \forall\, i \neq j.$$

Then, the second value of the error function is given by $$\bar{E}_2 = \frac{1}{S}\sum_{s=1}^{S}\sum_{r_j=0}^{3} d_{r_j m_j}^{(j)} \tilde{\omega}^2_{m_1^{(s)} \ldots m_{j-1}^{(s)} r_j m_{j+1}^{(s)} \ldots m_N^{(s)}} - \left(\frac{1}{S}\sum_{s=1}^{S} \omega_{m_1^{(s)} \ldots m_N^{(s)}}\right)^2.$$

In this way, it is possible to calculate all partial derivatives of the statistical error function and to carry out an optimization, e.g., via a gradient search. This allows to define a new local POVM associated to the qubit $q_j$ which leads to a smaller value of the statistical error function than the previous one. This new local POVM is parametrizable by new operator parameters. The new operator parameters are used as the input for the next iteration of the adaptive measurement routine. The adaptive measurement routine is repeated until a convergence rule is fulfilled. For example, the adaptive measurement routine is repeated until the first value of the statistical error function is smaller than a threshold value.

6. Calculation of the Estimator

The method also comprises calculating a value of the estimator $$\bar{O} = \frac{1}{S}\sum_{s=1}^{S} \omega_{m_1^{(s)} \ldots m_N^{(s)}}.$$

The calculation may be performed at each iteration of the adaptive measurement routine. This leads to intermediate results for the value of the estimator. Alternatively, it may be carried out once the adaptive measurement routine has terminated, i. e. when the convergence rule is fulfilled. This may lead to a final result of the estimator.

In case that the estimator is calculated for each iteration of the adaptive measurement routine, a more accurate value of the estimator may be achieved in the following way:

In the first iteration of the adaptive measurement routine a value $\bar{O}_1$ of the estimator and a corresponding value $\bar{E}_1$ of the statistical error function are calculated, as explained above. Then, one defines an initial average value of the estimator via $\bar{O}_{av,1}=\bar{O}_1$, and an initial average value of the statistical error function via $\bar{E}_{av,1}=\bar{E}_1$. Then, for each iteration g>i, one defines, after calculating the value of the estimator for this iteration, $\bar{O}_g$ and the first value of the statistical error function $\bar{E}_g$, a new average value of the estimator $\bar{O}_{av,g}=(\bar{O}_g\bar{E}_{av,g-1}+\bar{O}_{av,g-1}\bar{E}_g)/(\bar{E}_g+\bar{E}_{av,g-1})$ and a new average value of the statistical error function $\bar{E}_{av,g}=\bar{E}_{av,g-1}\bar{E}_g/(\bar{E}_{av,g-1}+\bar{E}_g)$, wherein $\bar{O}_g$ is the value of the estimator and $\bar{E}_g$ is the value of the statistical error function calculated in the g-th iteration, and wherein the final estimated value of the observable quantity is defined as the new average value of the estimator once the convergence rule is fulfilled. In this way, one obtains for each iteration s an estimated average value of the estimator that minimizes the overall error according to the statistical error function and the measured data. It has been proven that this iterative mixing of the measurement outcomes is unbiased. I. e., the $\bar{O}_{av}$ converges to the mean value.

Results for One Example

FIG. 5 depicts numerical results for the estimation of the energy of a $H_2$ molecule mapped into a 4-qubit Hamiltonian using the Parity fermion-to-qubit mapping disclosed in "The Bravyi-Kitaev transformation for quantum computation of electronic structure", by J. Seeley et al, J. Chem. Phys. 137, 224109 (2012). The method according to the present invention is applied to the approximated ground state of the system which is obtained after the application of a VQE algorithm. The solid line shows the error of the estimation $|\bar{O}_{av,g}-\langle O\rangle|$ as a function of the total number of rounds of measurements S averaged over 100 realizations wherein $\langle O\rangle$ is the expectation value of the operator O. The dashed line shows the estimated error, i.e. $\bar{E}_{av,g}$ at the end of the iteration. The dotted line indicates the scaling $S^{-1/2}$ which is achieved for a standard measurement scheme. The method according to the present invention approaches the exact value faster than $S^{-1/2}$.

The invention claimed is:

1. Method for estimating a value of an observable quantity of a state of a quantum many-body system, said state being encodable as a qudit state of a register of N qudits via an encoding operation, the qudits being quantum-mechanical d-level systems, said observable quantity being associated with a Hermitian operator O acting on the qudit register, wherein said method comprises:

providing a register of N qudits, and dividing the N qudits in a partition of at least two subsets $S_j$ of qudits, j=1, . . . , J, J≥2, wherein the j-th subset contains $N_j$≥1 qudits, and wherein each subset $S_j$ contains one qudit, i. e., J=N and $N_j$=1 for all j=1, . . . , J;

associating to each subset $S_j$ of qudits an initial informationally complete local positive operator-valued measure representable by $$M_j \geq D_j^2$$

positive operators $$\prod_{m_j}^{(j)}, m_j = 0, \ldots, M_j - 1$$

with respective measurement outcome $m_j$, wherein $D_j$ is the dimension of the Hilbert space associated to the subset $S_j$ of qudits, the operators being parametrizable by an initial set of operator parameters;

defining an estimator for said observable quantity and an associated statistical error function of said estimator as a function of said operator parameters and the possible measurement outcomes of the local positive operator-valued measures;

iterating an adaptive measurement routine for optimizing the positive operators with respect to the statistical error function, wherein said adaptive measurement routine accepts said operator parameters as an input and comprises:

implementing said informationally complete local positive operator-valued measures parametrized by the operator parameters received as an input on said qudit register to obtain a set of measurement data as an output;

data processing said measurement data, wherein said data processing comprises calculating a first value of the statistical error function given said operator parameters and said measurement data and determining new operator parameters parametrizing an informationally complete local positive operator-valued measure for each subset of qudits $S_j$ as an input for the next iteration of the adaptive measurement routine, wherein said new operator parameters result in a smaller second value of the statistical error function given said measurement data than the first value, wherein said iteration is repeated until a convergence rule is fulfilled;

calculating a value of the estimator of the observable quantity given the measurement data and the operator parameters as an estimation of the value of the observable;

characterized in that implementing said informationally complete local positive operator-valued measures comprises for each round s of a given number S of rounds of measurements preparing the qudit register in an initial qudit state which is an encoding of said state of said quantum many-body system obtained via the encoding operation and applying a quantum circuit to said qudit state, said quantum circuit being representable as a quantum circuit which comprises only local unitary operations acting locally on the individual subsets $S_j$ of qudits, $U=U_1\otimes \ldots \otimes U_J$, wherein $U_j$ acts on the subset $S_j$ of qudits and is determined by the operator parameters, and projective measurements of the qudits onto a local basis of each of the subsets $S_j$ of qudits, the local basis for the subset $S_j$ being described by state vectors $|x_j\rangle$, $x_j=0, \ldots, D_j-1$.

2. The method according to claim 1, wherein for at least one subset of qudits $S_j$ the associated local positive operator-valued measure is minimal.

3. The method according to claim 1, wherein the informationally complete local positive operator-valued measure associated to at least one set $S_j$ of qudits is representable by $D_j \cdot K_j$ positive operators $$\left\{\alpha_{k_j}^{(j)} U_{k_j}^{(j)\dagger} \left| x_j \right\rangle\!\left\langle x_j \right| U_{k_j}^{(j)}\right\}_{k_j=1, \ldots K_j, x_j=0, \ldots, D_j-1},$$

$K_j \geq D_j$, wherein $$\left\{\alpha_{k_j}^{(j)}\right\}_{k_j=1}^{K_j}$$

is a first probability distribution and $$\left\{U_{k_j}^{(j)}\right\}_{k_j=1}^{K_j}$$

is a set of local unitary operations on the qudits in the set $S_j$, said local positive operator-valued measure being parametrizable by operator parameters defining the probabilities $$\alpha_{k_j}^{(j)}$$

of the first probability distribution and the local unitary operations, and wherein implementing said local positive operator-valued measure for the set $S_j$ of qudits comprises for each round s of the S rounds of measurement sampling a value $k_j \in [1, K_j]$ according to the first probability distribution $$\left\{\alpha_{k_j}^{(j)}\right\}_{k_j=1}^{K_j}$$

and applying the local unitary operation $$U_{k_j}^{(j)}$$

corresponding to the sampled value $k_j$ to the respective set $S_j$ of qudits followed by a projective measurement of said set $S_j$ of qudits onto its local basis $|x_j\rangle$, $j=0, \ldots, D_j-1$ resulting in a measurement outcome $$x_j^{(s)} \in \{0, 1, \ldots, D_j - 1\}$$

in the s-th round of measurement.

4. The method according to claim 3, wherein the informationally complete local positive operator-valued measure associated to at least one set of qudits $S_j$ is representable by $$\prod_{m_j}^{(j)} = \sum_{k_j=1}^{K_j} \sum_{x_j=0}^{D_j-1} P^{(j)}(m_j|k_j, x_j)\alpha_{k_j}^{(j)} U_{k_j}^{(j)\dagger}|x_j\rangle\langle x_j|U_{k_j}^{(j)},$$

positive operators $$M_j \geq D_j^2$$

wherein $\{\{P^{(j)}(m_j|k_j,x_j)\}_{m_j=0, \ldots, M_j-1}\}_{k_j=1, \ldots, K_j; x_j=0, \ldots D_j-1}$ is a set of $D_j \cdot K_j$ $M_j$-outcome conditional second probability distributions, said operator parameters further comprising parameters defining the probabilities $P^{(j)}(m_j|k_j,x_j)$, and implementing said positive operator-valued measure comprises post-processing of the measurement outcome $x_j$, wherein said post-processing comprises sampling a value $m_j \in [0, M_j-1]$ according to $P^{(j)}(m_j|k_j,x_j)$ with $k_j$ being the sampled index of the applied local unitary operation and relabeling the measurement outcome $x_j$ as $m_j$.

5. The method according to claim 3, wherein implementing said positive operator-valued measures comprises, for at least one set $S_j$ of qudits, sampling S values $$k_j^{(1)}, \ldots, k_j^{(S)} \in [1, K_j]$$

according to the first probability distribution $$\left\{\alpha_{k_j}^{(j)}\right\}_{k_j=1}^{K_j}$$

and defining a batch of S quantum circuits, wherein in the s-th quantum circuit the local unitary operation $$U^{(j)}_{k^{(s)}_j}$$

with the sampled value $$k^{(S)}_j$$

is applied to the set $S_j$ of qudits followed by a projective measurement of the qudits of said set $S_j$ of qudits onto the local basis of said set $S_j$ of qudits, and implementing said positive operator-valued measure further comprises applying the s-th quantum circuit in the s-th round of measurement.

6. The method according to claim 1, wherein said post-processing and/or said data processing and/or said calculating of a value of the estimator is carried out using a classical computing system.

7. The method according to claim 1, wherein said convergence rule is fulfilled when the first value of the statistical error function is smaller than a third threshold value.

8. The method according to claim 1, wherein said data processing comprises calculating the value of the estimator of the observable quantity.

9. The method according to claim 8, wherein an i-th iteration of said adaptive measurement routine comprises defining an initial average value of the estimator $\overline{O}_{av,i}$ and an initial average value of the associated statistical error function $\overline{E}_{av,i}$, said initial average value of the estimator being the value $\overline{O}_i$ of the estimator and the initial average value of the statistical error function being the first value $\overline{E}_i$ of the statistical error function obtained in the i-th iteration of the adaptive measurement routine, and wherein for each iteration g>i, said measurement routine comprises defining a new average value of the estimator $\overline{O}_{av,g}=(\overline{O}_g\overline{E}_{av,g-1}+\overline{O}_{av,g-1}\overline{E}_g)/(\overline{E}_g+\overline{E}_{av,g-1})$ and a new average value of the statistical error function $\overline{E}_{av,g}=\overline{E}_{av,g-1}\overline{E}_g/(\overline{E}_{av,g-1}+\overline{E}_g)$, wherein $\overline{O}_g$ is the value of the estimator and $\overline{E}_g$ is the value of the statistical error function calculated in the g-th iteration, and wherein the final estimated value of the observable quantity is defined as the new average value of the estimator once the convergence rule is fulfilled.

10. The method according to claim 9, wherein said convergence rule is fulfilled when the new average value of the statistical error function is smaller than a fourth threshold value.

11. The method according to claim 1, wherein said Hermitian operator associated to said observable O is decomposable in terms of local operators on the sets of qudits, $$O = \sum\nolimits_{i_1,\ldots,i_J} c_{i_1\ldots i_J} O^{(1)}_{i_1} \otimes \ldots \otimes O^{(J)}_{i_J},$$

with $$O^{(j)}_{i_j}$$

being a local operator acting on the qudits in the set $S_j$ of qudits, said local operator being representable as $$O^{(j)}_{i_j} = \sum\nolimits_{m_j=0}^{M_j-1} b^{(j)}_{i_j m_j} \prod\nolimits^{(j)}_{m_j},$$

and wherein the estimator is a function of $$\omega_{m_1 \ldots m_J} = \sum\nolimits_{i_1,\ldots,i_J} c_{i_1,\ldots,i_J} b^{(1)}_{i_1 m_1} \ldots b^{(J)}_{i_J m_J},$$

wherein $m_j$ is the measurement outcome of the implementation of the local positive operator-valued measure associated to the set $S_j$ of qudits, and in particular the estimator is of the form $$\overline{O} = \frac{1}{S}\sum\nolimits_{s=1}^{S} \omega_{m^{(s)}_1 \ldots m^{(s)}_J},$$

wherein $$m^{(s)}_j$$

is the outcome of the s-th round of measurement.

12. The method according to claim 11, wherein said statistical error function $\overline{E}$ is a function of the second moment of $\omega_{m_1 \ldots m_J}$ over the probability distribution $\{p_{m_1 \ldots m_J}\}$ to obtain the measurement outcome $(m_1, \ldots, m_J)$, and in particular $$\overline{E} = \frac{1}{S}\left[\frac{1}{S}\sum\nolimits_{s=1}^{S} \omega^2_{m^{(s)}_1 \ldots m^{(s)}_J} - \left(\frac{1}{S}\sum\nolimits_{s=1}^{S} \omega_{m^{(s)}_1 \ldots m^{(s)}_J}\right)^2\right].$$

13. The method according to claim 1, wherein said quantum many-body system is describable by a fermionic Hamiltonian of N modes, in particular by a Hamiltonian of the form $$H_F = \sum\nolimits_{p,q=1}^{N} h_{pq} a^\dagger_p a_q + \frac{1}{2}\sum\nolimits_{p,q,r,s=1}^{N} u_{pqrs} a^\dagger_p a^\dagger_q a_r a_s,$$

wherein $$a^\dagger_p$$

is a fermionic creation operator creating a fermionic particle in mode p, and $a_p$ is the corresponding fermionic annihilation operator.

14. The method according to claim 1, wherein said quantum many-body system is a fermionic system and said encoding operation is the Jordan-Wigner transformation or the Bravyi-Kitaev mapping or the JKMN mapping or the Parity mapping.

15. The method according to claim 1, wherein said qudits are superconducting qudits or ion qudits or photonic qudits.

16. An apparatus for estimating a value of an observable quantity of a state of a quantum many-body system, said state being encodable as a qudit state of a register of N qudits via an encoding operation, the qudits being quantum mechanical d-level systems, said observable quantity being associated with a Hermitian operator O acting on the qudit register, wherein said apparatus comprises:

a register of N qudits, wherein the N qudits are divided into a partition of at least two sets $S_j$ of qudits, j=1, . . . , J, J≥2, wherein the j-th subset contains $N_j$≥1 qudits, wherein each subset $S_j$ contains one qudit, i. e., J=N and $N_j$=1 for all j=1, . . . , J;

state preparation means for preparing the qudit register in an initial qudit state which is an encoding of said state of said quantum many-body system obtained via the encoding operation;

means for applying a quantum circuit to said qudit register, wherein said quantum circuit is representable as a quantum circuit which comprises only local unitary operations acting locally on the individual subsets $S_j$ of qudits, $U=U_1 \otimes \ldots \otimes U_J$, wherein $U_j$ acts on the subset $S_j$ of qudits, and projective measurements of the qudits onto a local basis of each of the subsets $S_j$ of qudits, the local basis for the subset $S_j$ being described by state vectors $|x_j\rangle$, $x_j=0, \ldots, D_j-1$;

data processing means;

control means, said control means being operative to iterate an adaptive measurement routine for optimizing positive operators with respect to a statistical error function, wherein said positive operators are defined by associating to each subset of $S_j$ of qudits, j=1, . . . , J, an initial informationally complete local positive operator-valued measure representable by $$M_j \geq D_j^2$$

positive operators $$\prod_{m_j}^{(j)}, m_j = 0, \ldots, M_j - 1$$

with respective measurement outcome $m_j$, wherein $D_j$ is the dimension of the Hilbert space associated to the subset $S_j$ of qudits, the positive operators being parametrizable by an initial set of operator parameters, and the statistical error function is given by defining an estimator for said observable quantity and an associated statistical error function of said estimator as a function of said operator parameters and the possible measurement outcomes of the local positive operator-valued measures;

wherein said adaptive measurement routine accepts said operator parameters as an input and comprises:

implementing said positive operator-valued measures parametrized by the operator parameters received as an input on said qudit register to obtain a set of measurement data as an output, wherein implementing said positive operator-valued measures comprises for each round s of a given number S of rounds of measurements preparing the qudit register in an initial qudit state which is an encoding of said state of said quantum many-body system obtained via the encoding operation by using the state preparation means and applying a quantum circuit to said qudit state using said means for applying a quantum circuit, said quantum circuit being representable as a quantum circuit which comprises only local unitary operations acting locally on the individual subsets $S_j$ of qudits, $U=U_1 \otimes \ldots \otimes U_J$, wherein $U_j$ acts on the subset $S_j$ of qudits and is determined by the operator parameters, and projective measurements of the qudits onto the local basis $|x_j\rangle$, $x_j=0, \ldots, D_j-1$ of each subset $S_j$ of qudits, and data processing said measurement data using said data processing means, wherein said data processing comprises calculating a first value of the statistical error function given said operator parameters and said measurement data and determining new operator parameters parametrizing an informationally complete local positive operator-valued measure for each set $S_j$ of qudits as an input for the next iteration of the measurement routine, wherein said new operator parameters result in a smaller second value of the statistical error function given said measurement data than the first value, wherein said iteration is repeated until a convergence rule is fulfilled; and means for calculating a value of the estimator of the observable quantity given the measurement data and the operator parameters as an estimation of the value of the observable using the data processing means.

17. A method for estimating a value of an observable quantity of a state of a quantum many-body system, said state being encodable as a qubit state of a register of N qubits via an encoding operation, said observable quantity being associated with a Hermitian operator O acting on the qubit register, wherein said method comprises:

providing a register of N qubits;

associating to each qubit $q_j$, j=1, . . . , N, an initial informationally complete local positive operator-valued measure representable by $M_j$≥4 positive operators $$\prod_{m_j}^{(j)}, m_j = 0, \ldots, M_j - 1$$

with respective measurement outcome $m_j$, the operators being parametrizable by an initial set of operator parameters;

defining an estimator for said observable quantity and an associated statistical error function of said estimator as a function of said operator parameters and the possible measurement outcomes of the local positive operator-valued measures;

iterating an adaptive measurement routine for optimizing the positive operators with respect to the statistical error function, wherein said adaptive measurement routine accepts said operator parameters as an input and comprises:

implementing said informationally complete local positive operator-valued measures parametrized by the operator parameters received as an input on said qubit register to obtain a set of measurement data as an output;

data processing said measurement data, wherein said data processing comprises calculating a first value of the statistical error function given said operator parameters and said measurement data and determining new operator parameters parametrizing an informationally complete local positive operator-valued measure for each qubit $q_j$ as an input for the next iteration of the adaptive measurement routine, wherein said new operator parameters result in a smaller second value of the statistical error function given said measurement data than the first value, wherein said iteration is repeated until a convergence rule is fulfilled; and calculating a value of the estimator of the observable quantity given the measurement data and the operator parameters as an estimation of the value of the observable, wherein implementing said informationally complete local positive operator-valued measures comprises for each round s of a given number S of rounds of measurements preparing the qubit register in an initial qubit state which is an encoding of said state of said quantum many-body system obtained via the encoding operation and applying a quantum circuit to said qubit state, said quantum circuit being representable as a quantum circuit which comprises only single-qubit operations determined by the operator parameters and projective measurements of the qubits onto the computational basis.

18. The method according to claim 17, wherein for at least one qubit $q_j$ the associated local positive operator-valued measure is minimal.

19. The method according to claim 17, wherein the informationally complete local positive operator-valued measure associated to at least one qubit $q_j$ is representable by $2K_j$ positive operators $$\left\{\alpha_{k_j}^{(j)} U_{k_j}^{(j)\dagger} \mid x_j\rangle\langle x_j \mid U_{k_j}^{(j)}\right\}_{k_j=1, \ldots K_j, x_j=0,1},$$

$K_j \geq 3$, wherein $$\left\{\alpha_{k_j}^{(j)}\right\}_{k_j=1}^{K_j}$$

is a first probability distribution and $$\left\{U_{k_j}^{(j)}\right\}_{k_j=1}^{K_j}$$

is a set of single-qubit unitary operations, said local positive operator-valued measure being parametrizable by operator parameters defining the probabilities $$\alpha_{k_j}^{(j)}$$

of the first probability distribution and the single-qubit unitary operations, and wherein implementing said positive operator-valued measure for the qubit $q_j$ comprises for each round s of the S rounds of measurement sampling a value $k_j \in [1, K_j]$ according to the first probability distribution $$\left\{\alpha_{k_j}^{(j)}\right\}_{k_j=1}^{K_j}$$

and applying the single-qubit unitary operation $$U_{k_j}^{(j)}$$

corresponding to the sampled value $k_j$ to the respective qubit $q_j$ followed by a projective measurement of said qubit $q_j$ onto the computational basis resulting in a measurement outcome $$x_j^{(s)} = 0 \text{ or } x_j^{(s)} = 1$$

in the s-th round of measurement.

20. The method according to claim 19, wherein the informationally complete local positive operator-valued measure associated to at least one qubit $q_j$ is representable by $M_j \geq 4$ positive operators $$\prod_{m_j}^{(j)} = \sum_{k_j=1}^{K_j} \sum_{x_j=0}^{1} P^{(j)}(m_j \mid k_j, x_j)\, \alpha_{k_j}^{(j)} U_{k_j}^{(j)\dagger} |x_j\rangle\langle x_j \mid U_{k_j}^{(j)},$$

wherein $\{\{P^{(j)}(m_j|k_j,x_j)\}_{m_j=0, \ldots, M_j-1}\}_{k_j=1, \ldots, K_j; x_j=0,1}$ is a set of $2K_j$ $M_j$-outcome conditional second probability distributions, said operator parameters further comprising parameters defining the probabilities $P^{(j)}(m_j|k_j,x_j)$, and implementing said positive operator-values measure comprises post-processing of the measurement outcome $x_j$, wherein said post-processing comprises sampling a value $m_j \in [0, M_j-1]$ according to $P^{(j)}(m_j|k_j, x_j)$ with $k_j$ being the sampled index of the applied single-qubit unitary operation and relabeling the measurement outcome $x_j$ as $m_j$.

21. The method according to claim 20, wherein implementing said positive operator-valued measures comprises, for the at least one qubit $q_j$, sampling S values $$k_j^{(1)}, \ldots, k_j^{(S)} \in [1, K_j]$$

according to the first probability distribution $$\left\{\alpha_{k_j}^{(j)}\right\}_{k_j=1}^{K_j}$$

and defining a batch of S quantum circuits, wherein in s-th quantum circuit the single-qubit unitary operation $$U_{k_j^{(s)}}^{(j)}$$

with the sampled value $$k_j^{(S)}$$

is applied to the qubit $q_j$ followed by a projective measurement of said qubit onto the computational basis, and implementing said positive operator-valued measure further comprises applying the s-th quantum circuit in the s-th round of measurement.

22. The method according to claim 17, wherein said post-processing and/or said data processing and/or said calculating of a value of the estimator is carried out using a classical computing system.

23. The method according to claim 17, wherein said convergence rule is fulfilled when the first value of the statistical error function is smaller than a first threshold value.

24. The method according to claim 17, wherein said data processing comprises calculating the value of the estimator of the observable quantity.

25. The method according to claim 24, wherein an i-th iteration of said adaptive measurement routine comprises defining an initial average value of the estimator $\overline{O}_{av,i}$ and an initial average value of the associated statistical error function $\overline{E}_{av,i}$, said initial average value of the estimator being the value $\overline{O}_i$ of the estimator and the initial average value of the statistical error function being the first value $\overline{E}_i$ of the statistical error function obtained in the i-th iteration of the adaptive measurement routine, and wherein for each iteration g>i, said measurement routine comprises defining a new average value of the estimator $\overline{O}_{av,g}=(\overline{O}_g\overline{E}_{av,g-1}+\overline{O}_{av,g-1}\overline{E}_g)/(\overline{E}_g+\overline{E}_{av,g-1})$ and a new average value of the statistical error function $\overline{E}_{av,g}=\overline{E}_{av,g-1}\overline{E}_g/(\overline{E}_{av,g-1}+\overline{E}_g)$, wherein $\overline{O}_g$ is the value of the estimator and $\overline{E}_g$ is the value of the statistical error function calculated in the g-th iteration, and wherein the final estimated value of the observable quantity is defined as the new average value of the estimator once the convergence rule is fulfilled.

26. The method according to claim 25, wherein said convergence rule is fulfilled when the new average value of the statistical error function is smaller than a second threshold value.

27. The method according to claim 17, wherein said Hermitian operator associated to said observable O is decomposable in terms of Pauli operators, O=

$$\sum_{i_1,\ldots,i_N=0}^{3} c_{i_1\ldots i_N}\sigma_{i_1}^{(1)}\otimes\ldots\otimes\sigma_{i_N}^{(N)},$$

with $$\sigma_{i_j}^{(j)}$$

being a Pauli operator acting on the qubit $q_j$, said Pauli operator being representable as $$\sigma_{i_j}^{(j)}=\sum_{m_j=0}^{M_j-1} b_{i_jm_j}^{(j)}\prod_{m_j}^{(j)},$$

and wherein the estimator is a function of $$\omega_{m_1\ldots m_N}=\sum_{i_1,\ldots,i_N=0}^{3} c_{i_1\ldots i_N} b_{i_1m_1}^{(1)}\ldots b_{i_Nm_N}^{(N)},$$

wherein $m_j$ is the measurement outcome of the implementation of the local positive operator-valued measure associated to qubit $q_j$, and in particular the estimator is of the form $$\overline{O}=\frac{1}{S}\sum_{s=1}^{S}\omega_{m_1^{(s)}\ldots m_N^{(s)}},$$

wherein $$m_j^{(s)}$$

is the outcome of the s-th round of measurement.

28. The method according to claim 27, wherein said statistical error function $\overline{E}$ is a function of the second moment of $\omega_{m_1\ldots m_N}$ over the probability distribution $\{p_{m_1\ldots m_N}\}$ to obtain the measurement outcome $(m_1, \ldots, m_N)$, and in particular $$\overline{E}=\frac{1}{S}\sum_{s=1}^{S}\omega^2_{m_1^{(s)}\ldots m_N^{(s)}}-\left(\frac{1}{S}\sum_{s=1}^{S}\omega_{m_1^{(s)}\ldots m_N^{(s)}}\right)^2.$$

29. The method according to claim 17, wherein said quantum many-body system is describable by a fermionic Hamiltonian of N modes, in particular by a Hamiltonian of the form $$H_F=\sum_{p,q=1}^{N} h_{pq}a_p^\dagger a_q+\frac{1}{2}\sum_{p,q,r,s=1}^{N} u_{pqrs}a_p^\dagger a_q^\dagger a_r a_s,$$

wherein $$a_p^\dagger$$

is a fermionic creation operator creating a fermionic particle in mode p, and $a_p$ is the corresponding fermionic annihilation operator.

30. The method according to claim 17, wherein said quantum many-body system is a fermionic system and said encoding operation is the Jordan-Wigner transformation or the Bravyi-Kitaev mapping or the JKMN mapping or the Parity mapping.

31. The method according to claim 17, wherein said qubits are superconducting qubits or ion qubits or photonic qubits.

32. An apparatus for estimating a value of an observable quantity of a state of a quantum many-body system, said state being encodable as a qubit state of a register of N qubits via an encoding operation, said observable quantity being associated with a Hermitian operator O acting on the qubit register, wherein said apparatus comprises:

a register of N qubits;

state preparation means for preparing the qubit register in an initial qubit state which is an encoding of said state of said quantum many-body system obtained via the encoding operation;

means for applying a quantum circuit to said qubit register, wherein said quantum circuit is representable as a quantum circuit which comprises only single-qubit operations and projective measurements of the qubits onto the computational basis;

data processing means;

control means, said control means being operative to iterate an adaptive measurement routine for optimizing positive operators with respect to a statistical error function, wherein said positive operators are defined by associating to each qubit $q_j$, j=1, . . . , N, an initial informationally complete local positive operator-valued measure representable by $M_j\geq4$ positive operators $$\prod_{m_j}^{(j)},\ m_j=0,\ \ldots\ ,M_j-1$$

with respective measurement outcome $m_j$, the positive operators being parametrizable by an initial set of operator parameters and the statistical error function is given by defining an estimator for said observable quantity and an associated statistical error function of said estimator as a function of said operator parameters and the possible measurement outcomes of the local positive operator-valued measures, wherein said adaptive measurement routine accepts said operator parameters as an input and comprises:

implementing said positive operator-valued measures parametrized by the operator parameters received as an input on said qubit register to obtain a set of measurement data as an output, wherein implementing said positive operator-valued measures comprises for each round s of a given number S of rounds of measurements preparing the qubit register in an initial qubit state which is an encoding of said state of said quantum many-body system obtained via the encoding operation by using the state preparation means and applying a quantum circuit to said qubit state using said means for applying a quantum circuit, said quantum circuit being representable as a quantum circuit which comprises only single-qubit operations determined by the operator parameters and projective measurements of the qubits onto the computational basis, data processing said measurement data using said data processing means, wherein said data processing comprises calculating a first value of the statistical error function given said operator parameters and said measurement data and determining new operator parameters parametrizing an informationally complete local positive operator-valued measure for each qubit $q_j$ as an input for the next iteration of the measurement routine, wherein said new operator parameters result in a smaller second value of the statistical error function given said measurement data than the first value, wherein said iteration is repeated until a convergence rule is fulfilled; and means for calculating a value of the estimator of the observable quantity given the measurement data and the operator parameters as an estimation of the value of the observable using the data processing means.

* * * * *